US010970458B1

(12) United States Patent
Dhanuka et al.

(10) Patent No.: US 10,970,458 B1
(45) Date of Patent: Apr. 6, 2021

(54) LOGICAL GROUPING OF EXPORTED TEXT BLOCKS

(71) Applicant: Adobe Inc., San Jose, CA (US)

(72) Inventors: Praveen Kumar Dhanuka, Howrah (IN); Matthew Fisher, San Carlos, CA (US); Arushi Jain, Delhi (IN)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/911,569

(22) Filed: Jun. 25, 2020

(51) Int. Cl.
*G06F 40/103* (2020.01)
*G06F 40/253* (2020.01)

(52) U.S. Cl.
CPC .......... *G06F 40/103* (2020.01); *G06F 40/253* (2020.01)

(58) Field of Classification Search
CPC .... G06F 40/103; G06F 40/129; G06F 40/253; G06F 40/205; G06F 40/216
USPC ........................................................ 715/256
See application file for complete search history.

(56) References Cited

U.S. PATENT DOCUMENTS

| | | | | |
|---|---|---|---|---|
| 6,188,779 | B1 * | 2/2001 | Baum | G06K 9/00463 382/114 |
| 8,543,911 | B2 | 9/2013 | Mansfield et al. | |
| 8,549,399 | B2 * | 10/2013 | Mansfield | G06F 40/106 715/246 |
| 2008/0144055 | A1 * | 6/2008 | Sussmeier | G06F 40/194 358/1.9 |
| 2010/0174732 | A1 * | 7/2010 | Levy | G06F 40/10 707/768 |
| 2010/0198827 | A1 * | 8/2010 | Yacoub | G06K 9/00463 707/739 |
| 2011/0055209 | A1 * | 3/2011 | Novac | G06Q 30/02 707/737 |
| 2015/0154164 | A1 * | 6/2015 | Goldstein | G06F 40/103 715/229 |

(Continued)

FOREIGN PATENT DOCUMENTS

WO WO-03098370 A2 * 11/2003 ........... G06F 40/284

OTHER PUBLICATIONS

Classification Definitions Class 715, Data Processing: Presentation Processing of Document, Operator Interface Processing, and Screen Saver Display Processing; Feb. 2011; pp. 1-33.*

*Primary Examiner* — Andrew R Dyer
(74) *Attorney, Agent, or Firm* — Finch & Maloney PLLC

(57) ABSTRACT

Techniques are disclosed for clustering text. The techniques may be employed to cluster text blocks that are received in either sequential reading order or arbitrary order. A methodology implementing the techniques according to an embodiment includes receiving text blocks comprising elements that may include one or more of glyphs, characters, and/or words. The method further includes determining an order of the received text blocks as one of arbitrary order or sequential reading order. Text blocks received in sequential reading order progress from left to right and from top to bottom for horizontal oriented text, and from top to bottom and left to right for vertical oriented text. The method further includes performing z-order text clustering in response to determining that the received text blocks are in sequential reading order and performing sorted order text clustering in response to determining that the received text blocks are not in sequential reading order.

18 Claims, 25 Drawing Sheets

(56) References Cited

U.S. PATENT DOCUMENTS

2017/0046317 A1* 2/2017 Geva ................ G06F 40/103
2019/0385054 A1* 12/2019 Zuev ................ G06F 40/216

* cited by examiner

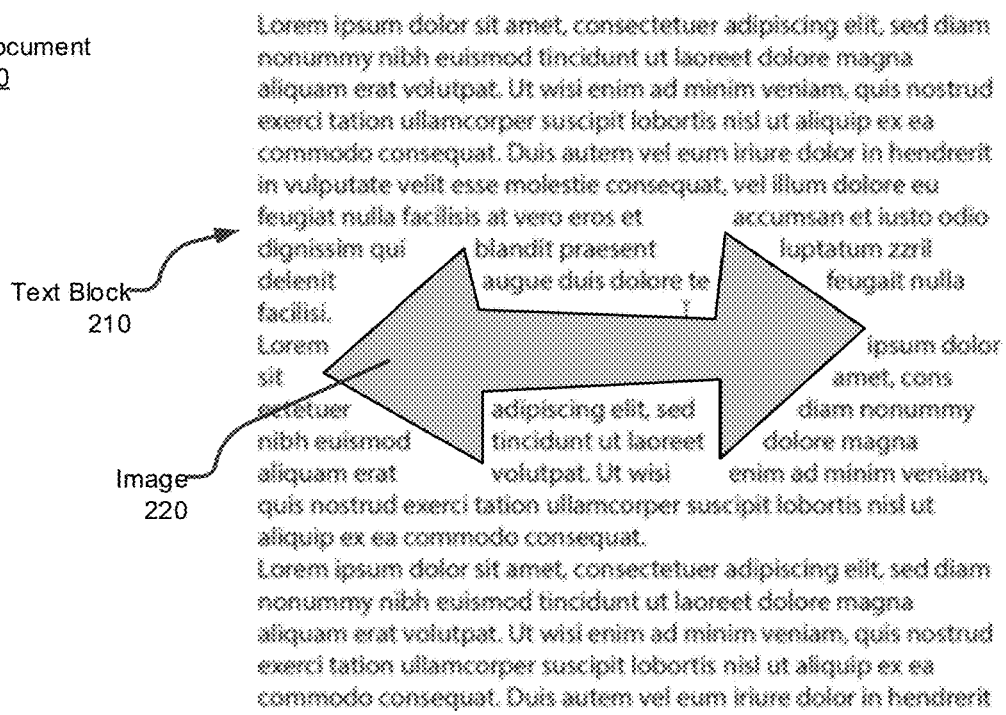
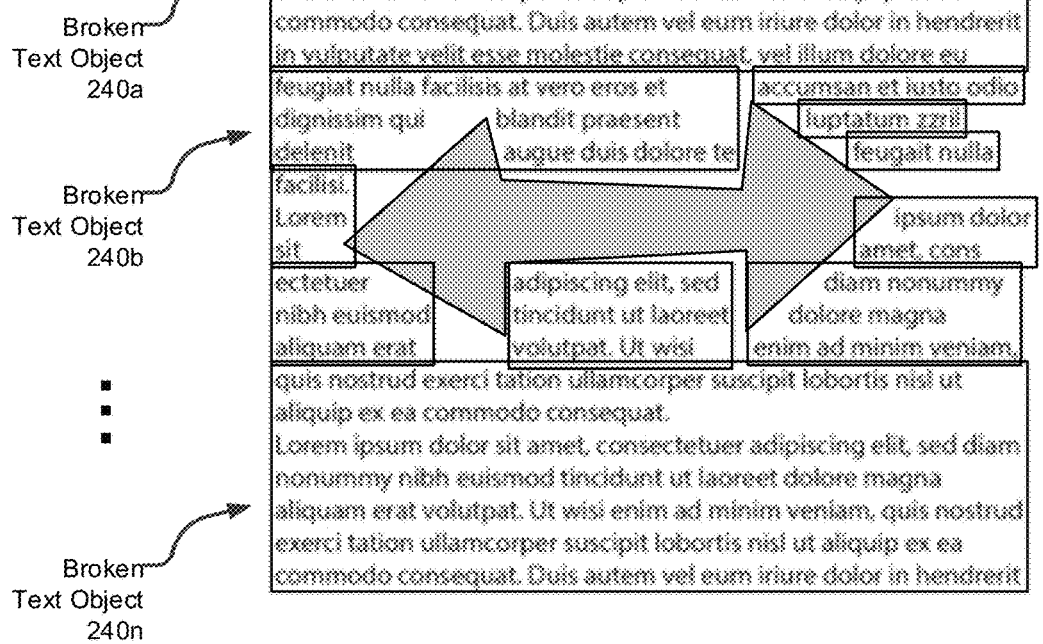
FIG. 2

Sequential Text
410

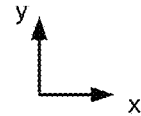

Received Order
520

1 2 3 4 5
This is the correct z-order
6 7 8 9
example. The stream is
10 11
correctly ordered.

Input Stream
530

This is the correct z-order example.
The stream is correctly ordered.

Unordered Text
420

Received Order
550

2 1 7 10 9
This is the incorrect z-order
8 3 5 6
example. The stream is
11 4
incorrectly ordered.

Input Stream
560 is This The ordered. Stream is the
example. z-order incorrect incorrectly

FIG. 5

Dynamic Spacing Tolerance
800

● This is first text line ●   ⟵⟶   ● This is second text line ●
810            Tolerance            820
               830

| This is first text line | This is second text line |

Broken into
new text line
835

Small size
small tolerance
↓
Distance b/w endpoints is
small due to small font size
840

Large size large ↔ tolerance

↓
Distance b/w endpoints
is large due to large font size
845

Text Rotation
850

Growing text line with rotation
860

Rotated text line 30 deg

Calculated Rotation
870

FIG. 8

Segregation based on
Orientation and Angle
900
Frame with Horizontal Text
910
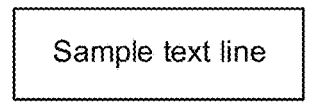
Rotated Text Frame
920
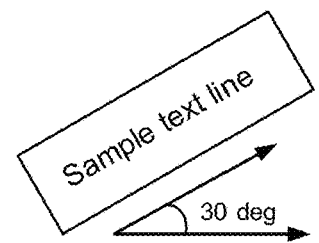
Text Frame with
Rotated Elements
930
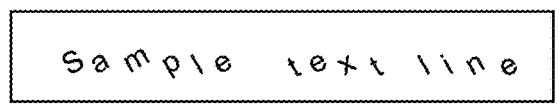
Text Frame Rotation and
Element Rotation
940
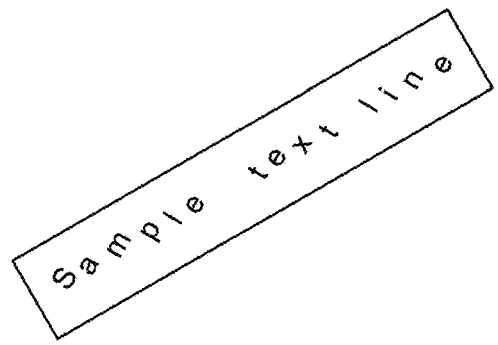
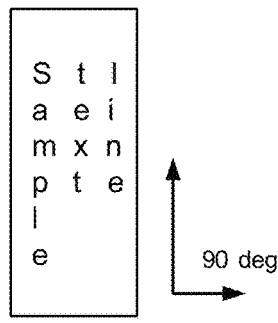
Frame with Vertical Text
950
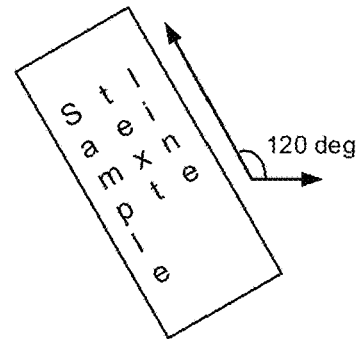
Rotated Text Frame
960
FIG. 9

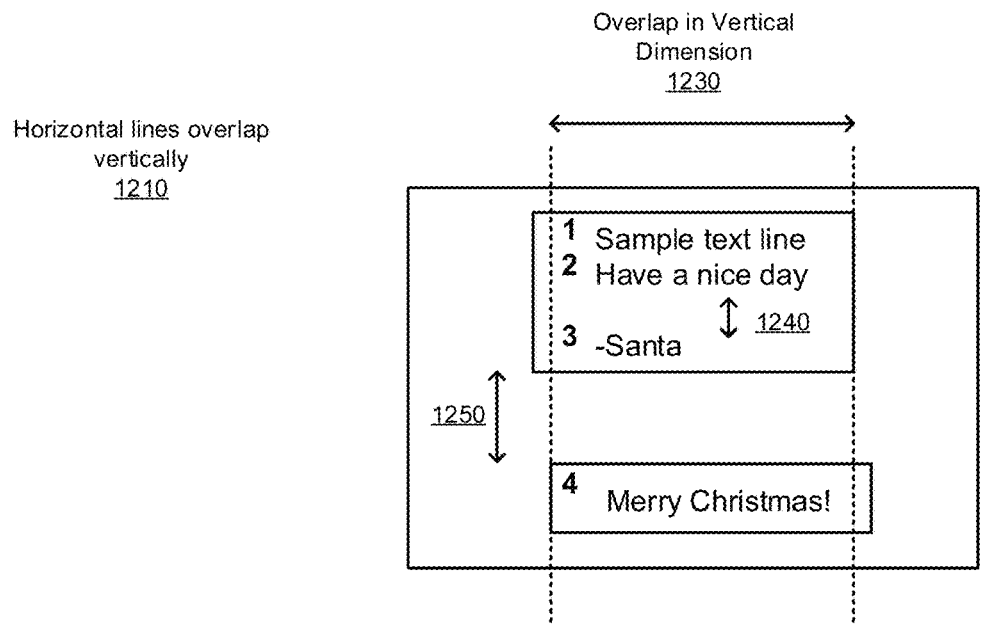
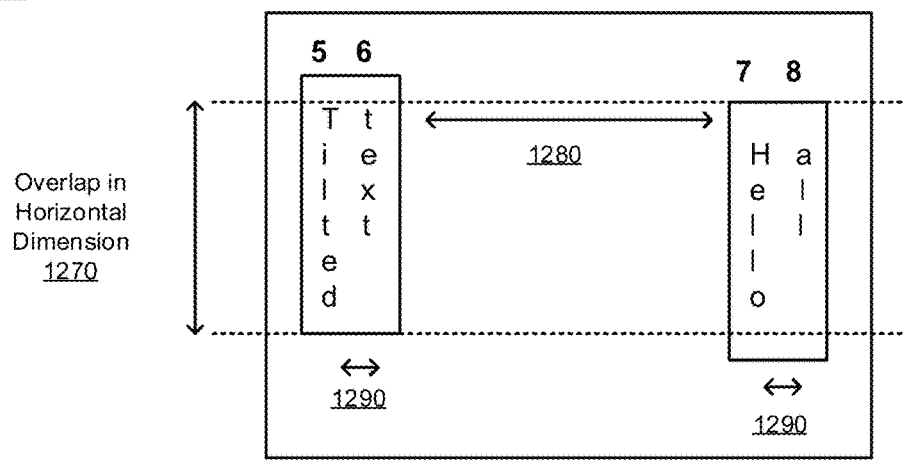
FIG. 12

Cluster Close Paragraphs
into Single Entity
1040
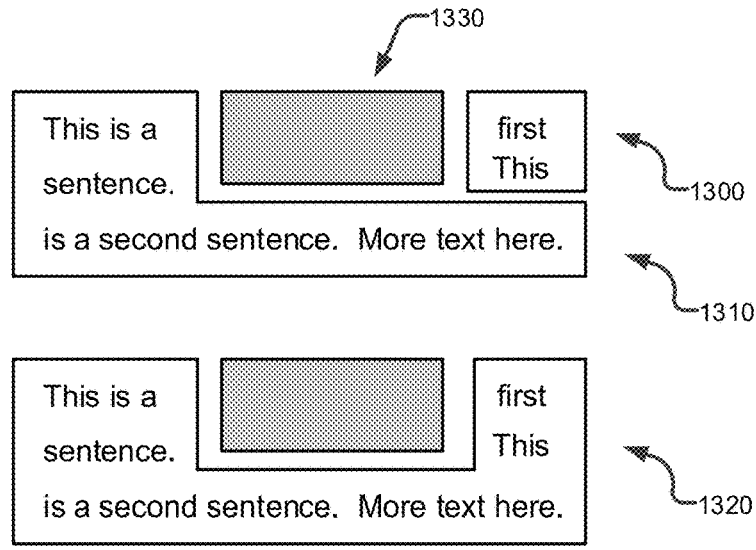
In Clustered Paragraphs,
Merge Lines Which Lie in
Same Straight Line
1050
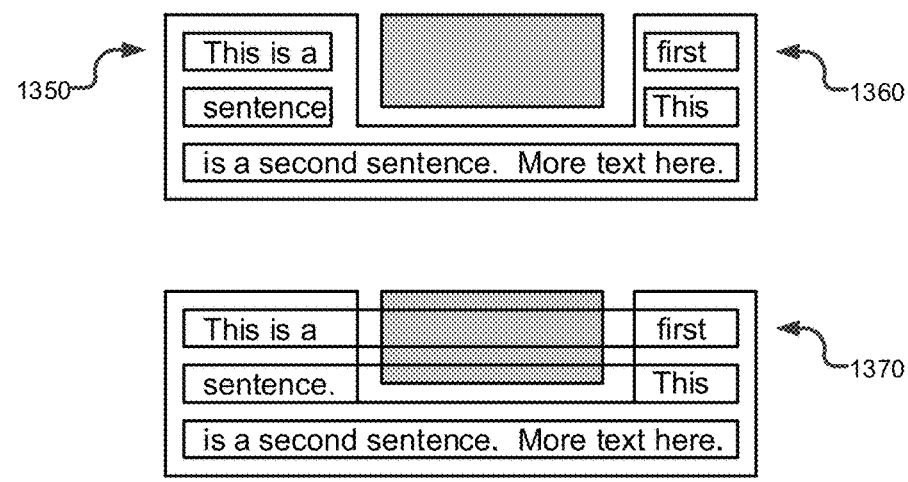
FIG. 13

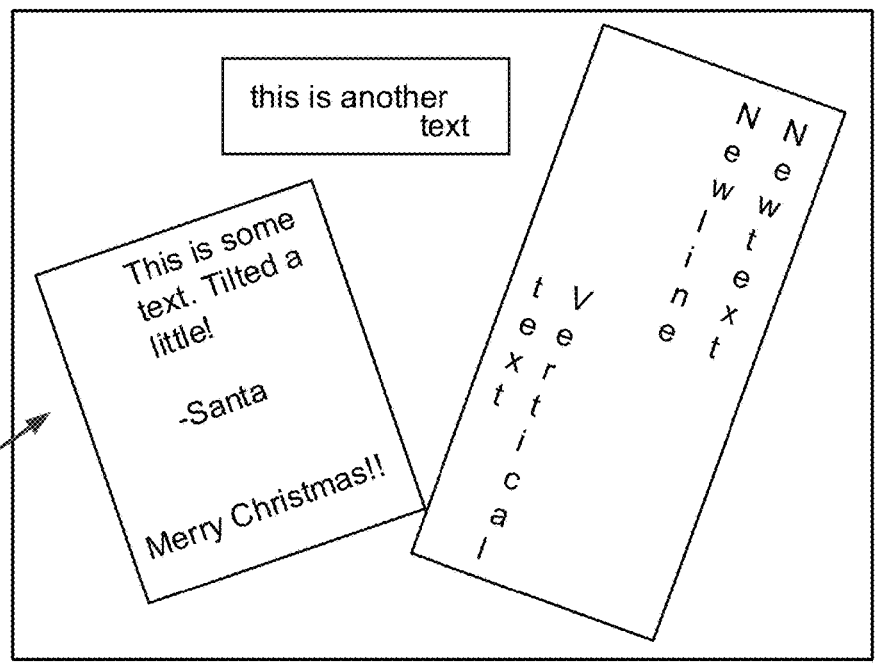
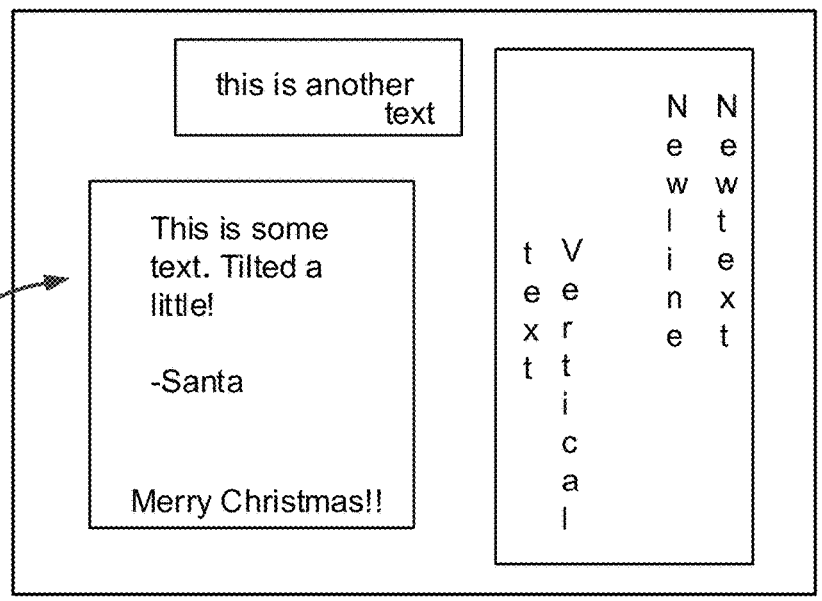
FIG. 15

Create Horizontal
Lines
1700

Horizontal lines 1800 this is another text

This is some text. Tilted a little!

-Santa

Merry Christmas !!

Vertical text

New text

Cluster Horizontal
Lines into
Paragraphs
1710

Clustered horizontal lines 1810 this is another text

This is some text. Tilted a little!

-Santa

Merry Christmas !!

Vertical text

New text

↔
1815

Create Vertical
Lines For
Paragraphs
1730

Vertical lines 1820 this is another text

This is some text. Tilted a little!

-Santa

Merry Christmas !!

Vertical text

New text

For Each Paragraph
Choose Correct Text
Orientation
1750
Horizontal Lines
1900
Vertical Lines
1910
Para 1
1920
Para 2
1930
Para 3
1940
Para 4
1950
Para 5
1960
FIG. 19

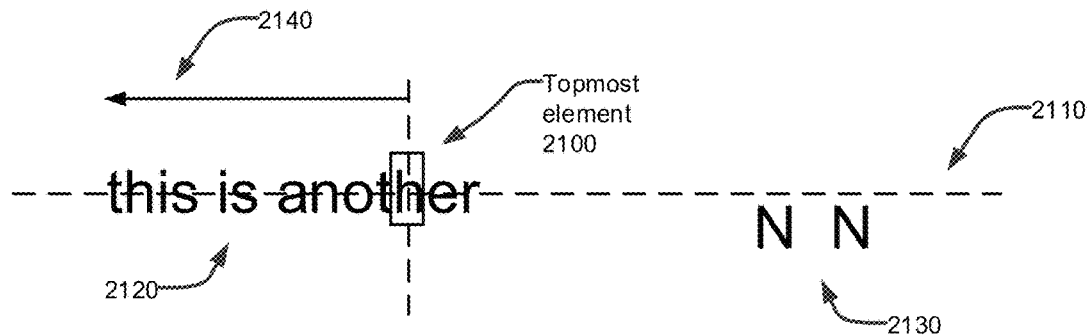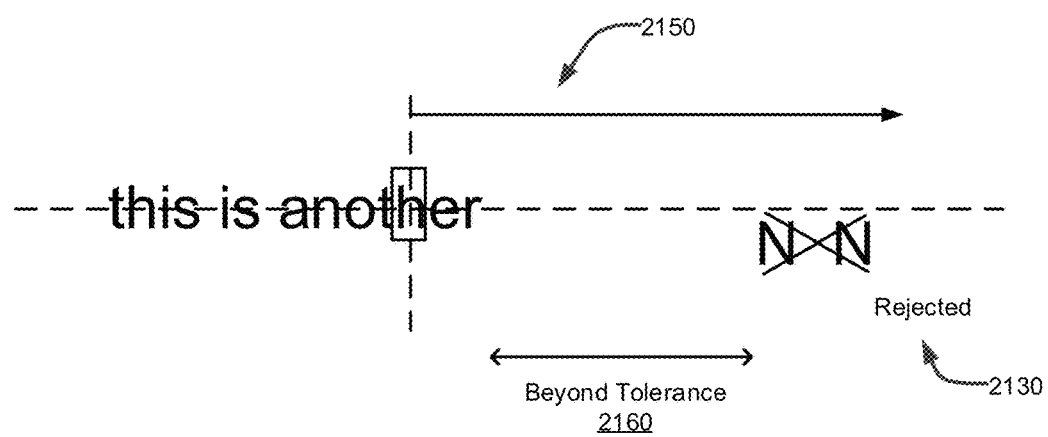
FIG. 21

US 10,970,458 B1

LOGICAL GROUPING OF EXPORTED TEXT BLOCKS

FIELD OF THE DISCLOSURE

This disclosure relates to techniques for porting a text object from a given document into another application or format, and more particularly, for receiving constituent parts making up a text object that was extracted in pieces from a document and clustering those pieces into a logical block in the domain to which the text object was imported.

BACKGROUND

Design documents often include text, images, and artwork in various formats and orientations. As part of a workflow for the creation and modification of such documents, these design documents may be exported into different file formats (e.g., SVG, PDF, legacy formats, etc.). When this happens, text objects in the documents (such as sentences or paragraphs) are typically broken into smaller pieces during the exportation process, to preserve the layout. The smaller pieces of text may be, for instance, one line sentences, sentence fragments, words, or glyphs. In any such cases, and will be explained in turn, this breaking of text objects into smaller pieces can cause difficulties for other document manipulation tools that may be used downstream in the workflow, or for other applications that process or interpret the text, including machine learning applications. In particular, the number of smaller pieces can be relatively large; thus, editing the overall text object made up by those pieces now becomes more burdensome (each piece must be edited individually). Moreover, the relative ordering of the smaller pieces making up a given text object may not be preserved, for example, when converting an image or other document into an editable format, such as PDF or some other desired format attributable to a downstream application of the workflow. Thus, logically grouping the smaller pieces of the multipart text object back into a single cluster typically necessitates manual intervention, especially when the text object involves text oriented in a manner other than horizontal (such as vertical text or angled text), or when the text object is wrapped around or otherwise interrupted by another object such as a graphic or inset image.

BRIEF DESCRIPTION OF THE DRAWINGS

FIG. 2 illustrates one example of a design document and how it can be broken into constituent parts, in accordance with an embodiment of the present disclosure.

FIG. 5 illustrates examples of sequential text and unordered text, in accordance with an embodiment of the present disclosure.

FIG. 8 illustrates examples of dynamic spacing tolerance and text frame rotation, in accordance with an embodiment of the present disclosure.

FIG. 9 illustrates examples of segregation based on orientation angle, in accordance with an embodiment of the present disclosure.

FIG. 12 illustrates examples of clustering of overlapping lines into paragraphs, in accordance with an embodiment of the present disclosure.

FIG. 13 illustrates examples of clustering and merging operations, in accordance with an embodiment of the present disclosure.

FIG. 15 illustrates examples of segregated rotation clusters and inverse rotation, in accordance with an embodiment of the present disclosure.

FIG. 18 illustrates examples of line creation and clustering, in accordance with an embodiment of the present disclosure.

FIG. 19 illustrates examples of selection of correct text orientation, in accordance with an embodiment of the present disclosure.

FIG. 21 illustrates examples of horizontal line creation, in accordance with an embodiment of the present disclosure.

DETAILED DESCRIPTION

Figure 1:
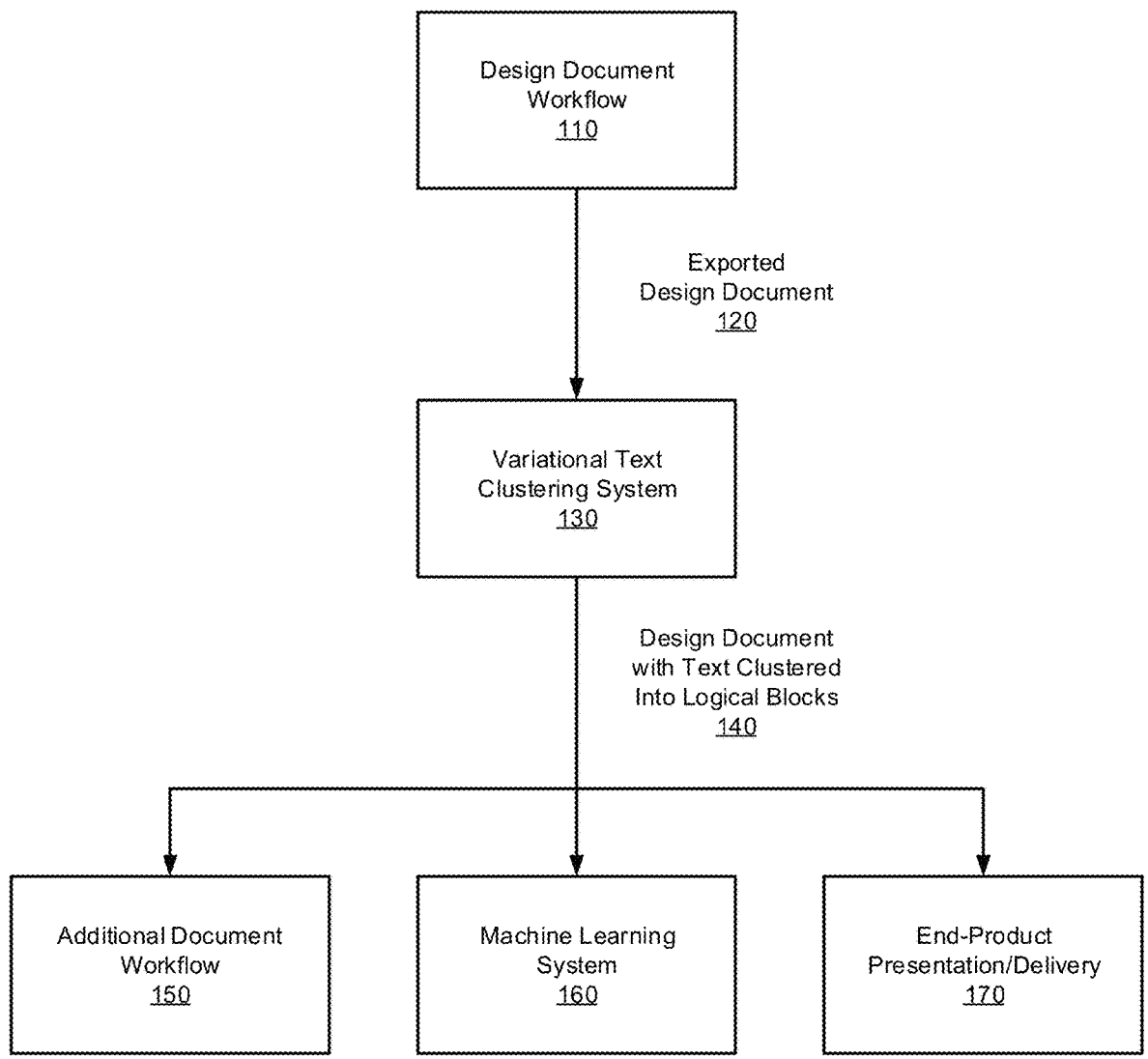
FIG. 1 is a top-level block diagram of a variational text clustering system deployed in a design document workflow, the system for clustering constituent parts making up a text object that was extracted in pieces from a given document, in accordance with an embodiment of the present disclosure.

Techniques are disclosed for porting a text object from a given document into another application or format. The techniques are particularly useful when the text object being ported includes text oriented in a non-horizontal fashion (such as angled text or vertical text), or text that is interrupted by another object such as a graphic, but can be used when importing any type of text object. The techniques do not require any document structure information, and can thus be used on both structured documents or unstructured documents. The text object may be, for instance, a sentence, a paragraph, or some other body of textual content that is exported to a new domain in multiple parts referred to herein as text blocks. In one example embodiment, the techniques are embodied in a method that includes receiving the text blocks making up a text object that was extracted in pieces from a given design document, and clustering those text blocks in a logical group (also referred to herein as a logical block) within the downstream application or format, or some other target domain. The clustering technique used depends on whether the text blocks are received in a sequential reading order or a random order. In particular, if the sequential reading order of the received text block stream is known, then a first clustering methodology is used to cluster the received text blocks into their respective text objects. This first methodology is referred to herein as z-order clustering. On the other hand, if the sequential reading order of the received text block stream is unknown, then a second clustering methodology is used to cluster the received text blocks into their respective text objects. This second methodology is referred to herein as sorted order text clustering. In any such cases, rather than relying on given document structure information (which may or may not be available), the clustering is accomplished by interrogating relative positions of the received text blocks to determine the correct logical group of text blocks making up a given text object. All scenarios of text placement can be successfully processed by the methodology, including for example those scenarios involving vertical text, or a combination of vertical and horizontal text, or any random rotated horizontal text, or any random rotated vertical text, or any combination of rotated horizontal and vertical text. Such scenarios of text placement are generally referred to herein as variational text. Numerous embodiments will be appreciated in light of this disclosure.

The term design document as used herein refers to any digital document that includes one or more text objects. The document may further include graphics, embedded video or audio, or any other digital content. The document can be generated in a certain document format using any number of applications, and can be exported into a second document having another format using any number of other applications. The document may be structured or unstructured. A structured document is one that includes information indicative of that document's organization or structure, the information being separate from the document's presentation content (e.g., any editable document format that provides document structure information). An unstructured document lacks such information (e.g., an image such as a bitmap).

The term text object as used herein refers to a complete piece of textual content of a design document. The text object is made up of one or more text lines, each text line including a plurality of text blocks. Example text objects include, for instance, a sentence, a paragraph, or some other body of textual content that is exported to a new domain in multiple parts referred to herein as text blocks.

The term text line as used herein refers to a combination of two or more text blocks along a given axis. Note it is possible that some text lines of a text object may only include one text block, but typically at least one of the text lines making up a text object will include two or more text blocks along a given axis.

The term text block as used herein refers to a piece of a text object. Example text blocks include, for instance, a glyph (symbol), character, number, a word, a phrase or sentence fragment, a sentence, or any combination of these things oriented along a given axis. In some cases, for example, a text block is the smallest portable piece of a text object, when exporting that text object into a new domain. As will be appreciated, the resolution at which a text object is broken into smaller text blocks can vary (text blocks can be at single character level, word level, phrase level, or some other resolution).

The term logical block as used herein refers to a group of text blocks that make up or otherwise correspond to a text object. The logical block can be, for example, selected and acted on as a whole during editing operations, rather than having to individually edit each of the text blocks of that logic block.

The term variational text as used herein generally refers to text scenarios other than simple horizontal text, such as vertical or angled text, or text with varying orientations (e.g., some combination of horizontal, vertical, and angled text), or text that is interrupted by another object (e.g., a line of text that is effectively broken into two lines by an image or graphic, such as sometimes done with an inset image that corresponds to the textual description provided). The text may comprise, for instance, any combination of glyphs (symbols), characters, numbers, fonts, font sizes, or style attributes.

The term sequential reading order as used herein generally refers to a predictable or otherwise known order that is not arbitrary or random. For instance, when text blocks are exported from a first digital document to a second digital document, text lines of the second digital document can be populated with the incoming text blocks in a sequential fashion, such as from left to right and top to bottom for horizontal oriented text, and top to bottom and left to right for vertical oriented text. In such cases, each text line sequentially grows as text blocks are populated in that text line, until the text line is completed. Then, the next text line is sequentially populated, and so on, until the second document is fully populated with text blocks. However, in other example cases, text lines of the second digital document can be populated with the incoming text blocks in a non-sequential random fashion, such as in a random checkerboard pattern where text block placement in the second document jumps around from a first text line to second text line, and then back to the first text line, or from the beginning of a text line to the end of that text line and then back to the beginning of that text line, and so on, until the second document is fully populated with text blocks. Any number of sequential and non-sequential population patterns can be used, wherein the location of each incoming text block within an overall text block grid of the second document is defined by a grid coordinate associated with that text block. To this end, the order of the incoming text blocks in a serialized input stream effectively defines the pattern by which the grid is populated, with each incoming text block accompanied with a corresponding grid coordinate (e.g., cartesian x,y, or other grid system).

General Overview

As noted previously, design documents often include text, images, and artwork in various formats, rotations, and orientations, including text wrap around embedded images. Upon export into different file formats, the text objects in the documents are typically broken into smaller pieces to preserve the layout. The density of these broken smaller pieces varies depending on how the text is broken for each paragraph, and for different font sizes and character properties. This can cause problems for other document manipulation tools that may be used in the downstream workflow, or for other applications that process the text, including machine learning applications that attempt to analyze and interpret the text. For instance, in some cases, the relative ordering of the elements of the text objects may not be preserved, for example when converting images into editable PDF formats, which can make it difficult or impossible to edit the text (e.g., because there are too many pieces that are not logically clustered). Available technical solutions for reassembling the broken smaller pieces into a correct order are inadequate as they tend to fail for text orientations other than horizontal, such as in cases where the text is vertical or rotated to be on an angle. Available solutions also tend to fail for cases where the text is wrapped around embedded images, or otherwise interrupted by other objects. These existing approaches generally fail because of the computational complexity that arises from the enormous number of possibilities for text layout formatting and placement combinations that can be realized in design document applications. As such, users must either operate on individual pieces of a given text object rather than the overall text object itself (which is undesirable), or resort to manual recombination of the smaller text object pieces (which may not be practical, given the number of pieces generated during the exportation process). Thus, and as will be appreciated in light of this disclosure, a technical solution to automatically cluster variational text to improve the design document workflow is needed.

Figure 3:
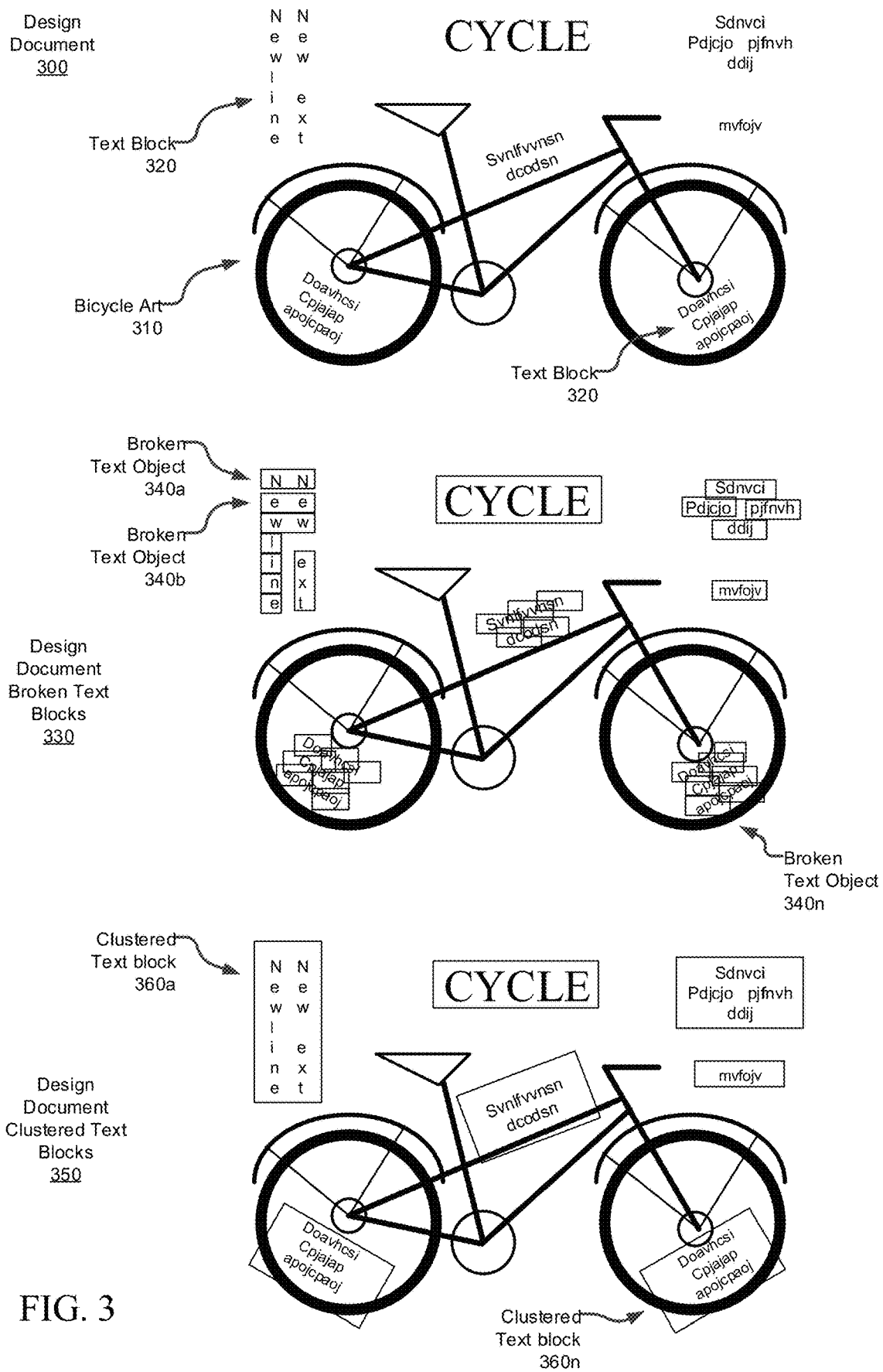
FIG. 3 illustrates another example of a design document and how it can be broken into constituent parts, in accordance with an embodiment of the present disclosure.

To this end, techniques are provided herein for variational text clustering to improve the design document workflow and enable other downstream applications, including machine learning systems, to process these design documents. As noted above, variational text generally refers to text scenarios other than simple horizontal text, such as vertical or angled text, or text with some combination of horizontal, vertical, and angled text, or text that is interrupted by another object (e.g., a line of text that is effectively broken into two lines by an image or graphic, such as sometimes done with an inset image that corresponds to the textual description provided). Some examples of variational text are shown in FIGS. 2 and 3 and will be described in greater detail below. In any case, a given design document may be exported into any one of numerous file formats and passed on to different applications. When this happens, the text objects in the document are typically broken into smaller pieces to preserve the layout. The clustering techniques disclosed herein provide for reassembling of the pieces to allow for correct processing and presentation of the text by downstream workflow applications, machine learning systems, and end-product delivery.

In more detail, a methodology implementing the techniques according to one example embodiment includes receiving text blocks (including position information, such as x,y coordinates of the text blocks) and determining whether the text blocks are ordered in a sequential reading order (e.g., left to right and top to bottom) or whether they are provided in an arbitrary order (e.g., an unordered or random order). For text blocks that are received in sequential reading order, a disclosed sequential order text clustering technique (also referred to herein as z-order text clustering) is employed. If, on the other hand, the text blocks are received in an unordered stream, a disclosed sorted order text clustering technique is used. The z-order and sorted order clustering techniques will be described in greater detail below, but at a high level they operate on the relative positions of text blocks (or text lines, as the case may be) to detect the correct logical text clusters making up paragraphs or other text objects of the given document. Note that no document structure information is required for the techniques to successfully operate. Thus, the disclosed techniques are not tied to any specific design document tools or formats. Each of the z-order and sorted order clustering techniques will now briefly be discussed in turn, prior to the further detailed description and reference to the figures.

The z-order clustering technique or method according to some embodiments includes generating text lines as a combination of two or more of the text blocks based on evaluation of an alignment cost function and a proximity measurement applied to the text blocks. If angled text is present, the method may also include calculating an angle of rotation of the generated text lines and rotating the generated text lines to correct for the angle of rotation. The method further includes determining an orientation of the generated text lines (e.g., horizontal or vertical), sorting the horizontal oriented text lines from top to bottom, and sorting the vertical oriented text lines from left to right. In some languages, the sorting order may be reversed, such as, for example, in Japanese where vertical text is read from right to left. The method further includes clustering the sorted horizontal oriented text lines into logical blocks (e.g., paragraph groupings), clustering the sorted vertical oriented text lines into logical blocks, and rotating the logical blocks to restore the angle of rotation of the text lines included in the logical blocks.

The sorted order clustering technique or method according to some embodiments includes calculating an angle of rotation of the text blocks, grouping the text blocks into clusters based on the angle of rotation, and rotating the clusters to correct for the angle of rotation associated with the cluster. The method also includes, for each cluster, creating horizontal lines comprising the text blocks included in the cluster, clustering the horizontal lines into horizontal paragraphs, and determining an average horizontal spacing between the elements of the text blocks included in the horizontal lines. The method further includes, for each horizontal paragraph, creating vertical lines comprising the text blocks included in the cluster and determining an average vertical spacing between the elements of the text blocks included in the vertical lines. The method further includes choosing a horizontal line format if the average horizontal spacing is less than the average vertical spacing, otherwise choose a vertical line format. The method further includes rotating the paragraphs to restore the angle of rotation of the clusters associated with the paragraphs.

Many other variations and alternative embodiments will be appreciated in light of this disclosure.

Framework and System Architecture

FIG. 1 is a top-level block diagram 100 of a variational text clustering system 130 deployed in a design document workflow 110, in accordance with an embodiment of the present disclosure. Specific details of the variational text clustering system 130 are described in turn with respect to FIGS. 2-25, but FIG. 1 shows one example context in which the system 130 can be used. Other contexts will be appreciated as well, and the present disclosure is not intended to be limited to any particular ones. As can be seen in this example context, a design document 120 is exported from a design document workflow 110 into the variational text clustering system 130, which outputs the design document with its text clustered into logical blocks 140. The design document 140 (with its text objects so clustered), can then be exported to any number of downstream applications subsequent processing. As will be appreciated, having the text clustered into logical blocks facilitates that downstream processing.

The design document workflow 110 may comprise, for example, one or more applications configured to manipulate text and images in order to generate design documents. The applications may include, for instance, illustrator tools, text editing and manipulation tools, image processing tools, photo manipulation tools, and the like. These applications may generate exported design documents 120.

FIG. 2 illustrates one example of such a design document 200 which comprises a large block of text 210 that is wrapped around a centrally located artistic image of a bidirectional arrow 220. FIG. 2 also shows the design document with broken text 230, for example after exporting to a selected file format such as PDF, which is how the document might be imported to a subsequently employed application. The single text block 210 is broken into smaller pieces 240a, 240b, ... 240n surrounding the perimeter of the image, and these pieces fail to capture the fact that the single text block is intended to wrap around the image. Variational text clustering system 130 is configured to combine or cluster the pieces 240a, 240b, ... 240n back into the single text block 210. FIG. 3 illustrates another example of a design document 300, which shows drawing art of a bicycle 310 along with accompanying text blocks 320. FIG. 3 also shows the design document with broken text 330. The text blocks 320 are broken into smaller pieces 340a, 340b, ... 340n which do not correctly capture the intended segmentation of text objects. FIG. 3 also shows the design document with clustered text blocks 350, after processing by variational text clustering system 130. The pieces 240a, 240b, ... 240n have been combined or clustered into correct logical text blocks 360a, ... 360n.

In any such cases, the design document 140 generated by the variational text clustering system 130 can be imported into any number of downstream applications. In one such example use case, the design documents with text clustered into logical blocks 140, as generated by variational text clustering system 130, may be imported by subsequent follow-on applications to perform additional downstream document workflow processing 150. This workflow may include, for example, operations such as text editing (e.g., insertion, deletion, cut-and-paste, etc.), text manipulation, text formatting, highlighting, and searching to name a few examples. In another example use case, text clustering as provided herein allows applications to extract information from the document, such as text content, font, font-size and other character properties of text blocks. This information is often useful for preparing datasets for training of machine learning systems 160 to find font pairs that are used in the same text object, correlate between font/character properties and text content, and perform auto completion of text, to name a few examples. Additionally, the design documents with clustered text 140 may be presented as an end-product 170 for presentation to the user or delivery to a client. It will be appreciated that numerous other post-clustering downstream applications and example use cases are possible in light of the present disclosure.

Figure 4:
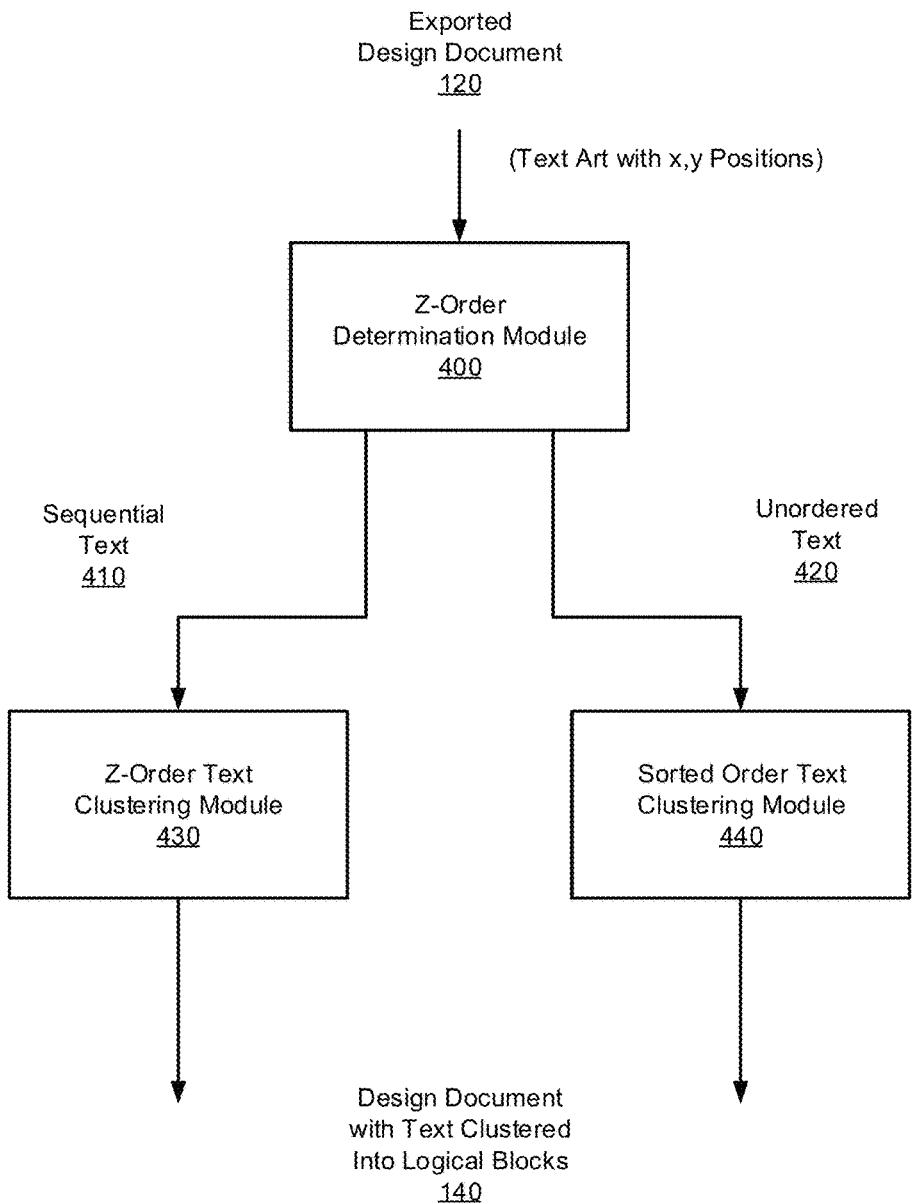
FIG. 4 is a top-level block diagram of the variational text clustering system shown in FIG. 1, configured in accordance with an embodiment of the present disclosure.

FIG. 4 is a top-level block diagram of the variational text clustering system 130, configured in accordance with an embodiment of the present disclosure. The text clustering system 130 is configured to receive a document, such as a design document 120 exported from a design document workflow application 110. The design document 120 includes one or more text blocks comprising elements such as glyphs (symbols), characters, and/or words, along with positional data for each text block, such as an x,y coordinate in a cartesian plane. The text clustering system 130 is shown to include a z-order determination module 400, a z-order text clustering module 430, and a sorted order text clustering module 440.

The z-order determination module 400 is configured to analyze the incoming stream of text blocks (also referred to as text art) and determine the ordering of those blocks as being either in an arbitrary order or a sequential reading order (z-order). Sequential reading order generally progresses from left to right and top to bottom for horizontal oriented text, and top to bottom and left to right for vertical oriented text, although this may vary in some languages. As previously noted, any sequential reading order can be used. In contrast, arbitrary or unordered text is received in a generally random order where the position of each new text block changes in abrupt jumps. This is illustrated in FIG. 5, which shows one example of sequential text 410 and one example of unordered text 420, in an x,y cartesian coordinate system. The received order 520 of text blocks making up the sequential text 410 runs from left to right and top to bottom as numbered (1 through 11) and the input stream 530 is in normal reading order. Thus, the text blocks will populate the destination document in a sequential fashion. In contrast, the received order 550 of text blocks making up the unordered text 420 jumps around in a haphazard manner as indicated by the numbering (1 through 11) and the input stream 560 is shown to be out of normal reading order. Thus, the text blocks will populate the destination document in a non-sequential, random checkerboard fashion.

The determination of arbitrary versus z-order may be performed using any suitable means or technique (for example, based on heuristics) in light of the present disclosure. For instance, in some embodiments, z-order determination module 400 is programmed or otherwise configured to interrogate a grid coordinate accompanying each incoming text block, and determine that same orientation text lines are populating in the destination digital document in a sequential fashion, based on that interrogation. For instance, in some such cases, each text line sequentially grows as text blocks are populated in that text line, until the text line is completed. Then, the next text line is sequentially populated, and so on, until the destination document is fully populated with text blocks. The z-order determination module 400 is further programmed or otherwise configured to determine when text lines of the destination digital document are being populated with the incoming text blocks in a non-sequential random fashion, based on the interrogation of the text block grid coordinates. For instance, in some such cases, the text lines of the destination document are populated in a random checkerboard pattern where text block placement in the destination document jumps around from a first text line to second text line, and then back to the first text line, or from the beginning of a text line to the end of that text line and then back to the beginning of that text line, and so on, until the destination document is fully populated with text blocks. In some embodiments, a grammatical analysis of the incoming text stream (or a portion thereof) may be performed to detect grammatical errors, and a relatively high error rate can be employed as an indication that the text blocks are in an arbitrary order. Although the means for heuristically determining if text blocks received in an input stream are provided in a sequential reading order can vary from one embodiment to the next, in some example embodiments, the z-order determination module 400 comprises one or more processors (e.g., microprocessor or central processing unit, graphics processing unit, digital signal processor, or a combination of such) programmed or otherwise configured to analyze text block placement (e.g., based on given text block x,y coordinates, which identify the location of a text block within an overall grid making up the destination document being created as a resulting of the exportation process) and/or perform such grammatical analysis or other heuristic analysis to determine if the text blocks are received in sequential reading order. Note that the arbitrary order is independent of a sequential reading order.

The z-order text clustering module 430 is a first clustering means and is configured to cluster text with reliance on the sequential reading order, as will be explained in greater detail below. The sorted order text clustering module 440 is a second clustering means and is configured to cluster text without reliance on any particular order of the received text stream, as will also be explained in greater detail below. The first and second clustering means may comprise, for example, one or more processors (e.g., microprocessor or central processing unit, graphics processing unit, digital signal processor, or a combination of such) programmed or otherwise configured to perform text clustering as variously described herein.

Figure 6:
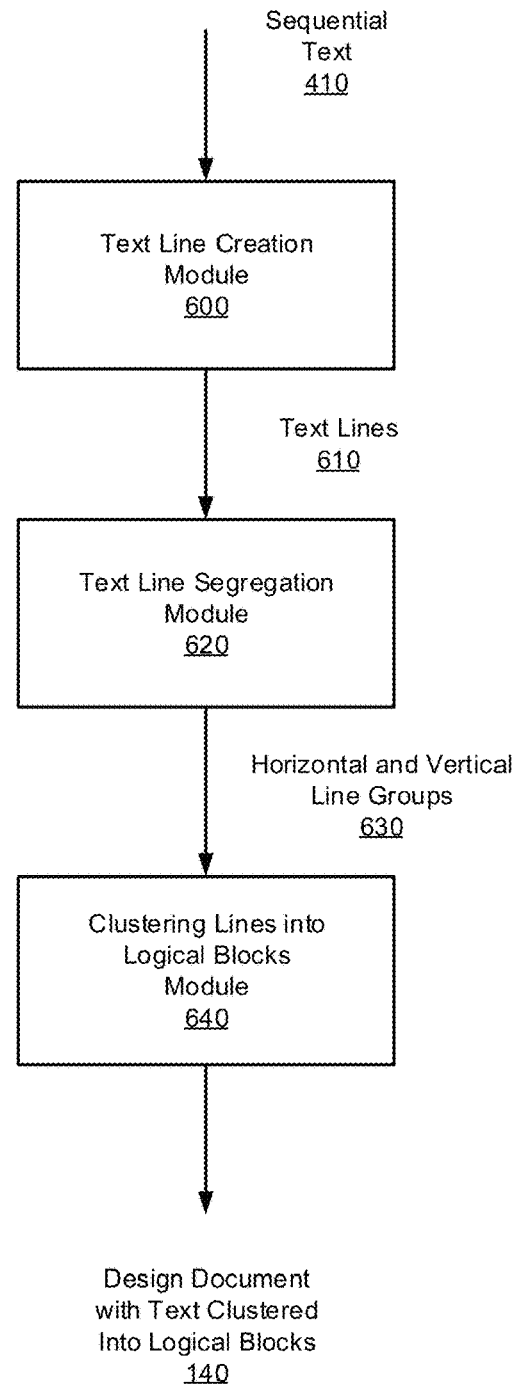
FIG. 6 illustrates a more detailed block diagram of the z-order text clustering module shown in FIG. 4, configured in accordance with an embodiment of the present disclosure.

FIG. 6 is a more detailed block diagram of the z-order text clustering module 430, configured in accordance with an embodiment of the present disclosure. The z-order text clustering module 430 is shown to include a text line creation module 600, a text line segregation module 620, and a module 540 for clustering lines into logical blocks.

The text line creation module 600 is configured to create initial text lines from the text blocks of the input data stream. Because the incoming stream is in sequential reading order, an attempt is made to create text lines from consecutive text blocks of the stream. The text blocks may contain a single character, numerous characters in the form of words, or series of words. Position information is also provided for each text block, and this may be in the form, for example, of x,y coordinates of opposing endpoints of the text block (e.g., the top left corner and the bottom right corner). In some embodiments, a newly received text block is added to an existing text line if the medial axes of the existing text line and the new text block lie within a selected shift tolerance (e.g., based on an alignment cost function), and if the distance between the existing text line and the new text block is less than a dynamic tolerance (e.g., a proximity measurement). The dynamic tolerance may be selected based on font, font size, and text scale. If these conditions are not met, then a new text line is started using the new text block.

Figure 7:
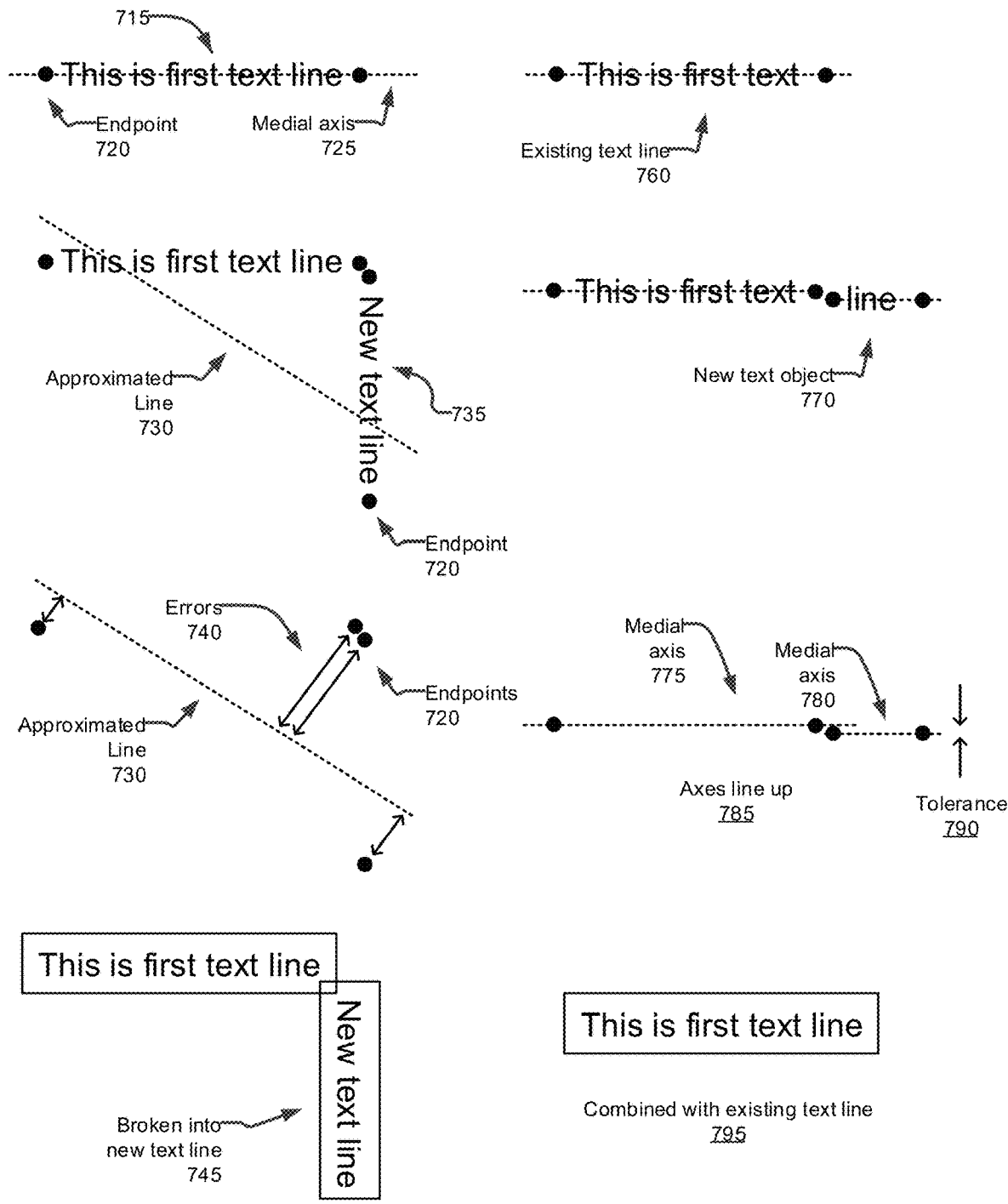
FIG. 7 illustrates examples of text line combinations, in accordance with an embodiment of the present disclosure.

Text line combinations are illustrated in FIG. 7, in accordance with an embodiment of the present disclosure. In the first example case 710, there is an existing text line "This is first text line" 715 and a new text object "New text line" 735. Endpoints 720 and medial axis 725 are indicated and can be calculated from the position information supplied with the received text blocks. In some embodiments, an approximated line 730 is generated as a best fit line based on the endpoints 720 of a combination of the existing text line 715 and the new text object 735. The approximated line 730 may be generated using a line fitter or linear solver or any suitable technique, in light of the present disclosure. Errors 740 are calculated based on the squares of the distances (or other suitable measure) between the endpoints 720 on the approximated line 730. In the example case 710, the sum of these errors (which represent an alignment cost function) is determined to exceed a selected tolerance, and thus the new text object 735 is broken into a new text line 745.

In the second example case 750, there is an existing text line "This is first text" 760 and a new text object "line" 770. The respective medial axes 775 and 780 line up as shown 785, to within a selected tolerance 790, and thus the new text object 770 is concatenated to the existing text line 760 to form a new combination text line 795.

FIG. 8 illustrates dynamic spacing tolerance 800 and text rotation 850, in accordance with an embodiment of the present disclosure. A dynamic tolerance 830 is selected, based on font, font size, and horizontal and vertical text scale. This is done because, at different font sizes and text scales the visual space or gap between adjacent characters varies, and text with a large font size will have a larger acceptable distance between elements than text with a small font size. This can be seen with the examples of small font sizes 840 and large font sizes 845 and the associated difference in distance between endpoints. In some example embodiments, the dynamic tolerance may be calculated, for instance, as a multiplicative product of a selected static tolerance value, a text font size value, and a text scale value. In the illustrated example, the spacing between the first text line 810 and the new text object 820 exceeds the threshold 830. As such, the new text object is broken into a new text line 835.

With respect to text rotation 850, as text line 860 grows, through combination of new text objects, the rotation angle 870 of that growing text line 860 is calculated and updated. In this example, the calculated rotation angle is shown to be approximately 30 degrees. Tracking of the text line rotation, whether horizontal, vertical, or of an intermediate angular value, is useful for further processing, as will be explained below.

Returning now to FIG. 6, the text line segregation module 620 is configured to segregate the text lines into horizontal and vertical line groups based on orientation angle. Two characteristics of a text frame are determined: (1) the angle of rotation of the text frame; and (2) the average angle of rotation of the elements of the text frame. If the angle of rotation of the text frame differs from the average angle of rotation of the elements of the text frame by approximately 90 degrees, then the frame is determined to include vertical text, otherwise the frame is determined to include horizontal text. This is illustrated in the examples shown in FIG. 9. In the frame with horizontal text 910, the frame is oriented at zero degrees and the elements (characters) are also oriented at zero degrees. The difference is zero, and thus the text is determined to be of horizontal orientation. In the rotated text frame 920, the frame is rotated to 30 degrees and the elements are also oriented at 30 degrees. The difference is zero, and thus the text is also determined to be of horizontal orientation. In the text frame with rotated elements 930, the frame is oriented at zero degrees and the elements are rotated to 30 degrees. The difference is 30, and thus the text is still determined to be of horizontal orientation. In example 940, the text frame is rotated to 30 degrees and the elements are rotated to 60 degrees. The difference is 30, and thus the text is still determined to be of horizontal orientation.

In example 950, the text frame is oriented at 90 degrees, but the elements are oriented at zero degrees. The difference is 90, and thus the text is determined to be of vertical orientation. An example 960, the text frame is oriented at 120 degrees in the elements are oriented at 30 degrees. The difference is 90, and thus the text is determined to be of vertical orientation.

Figure 10:
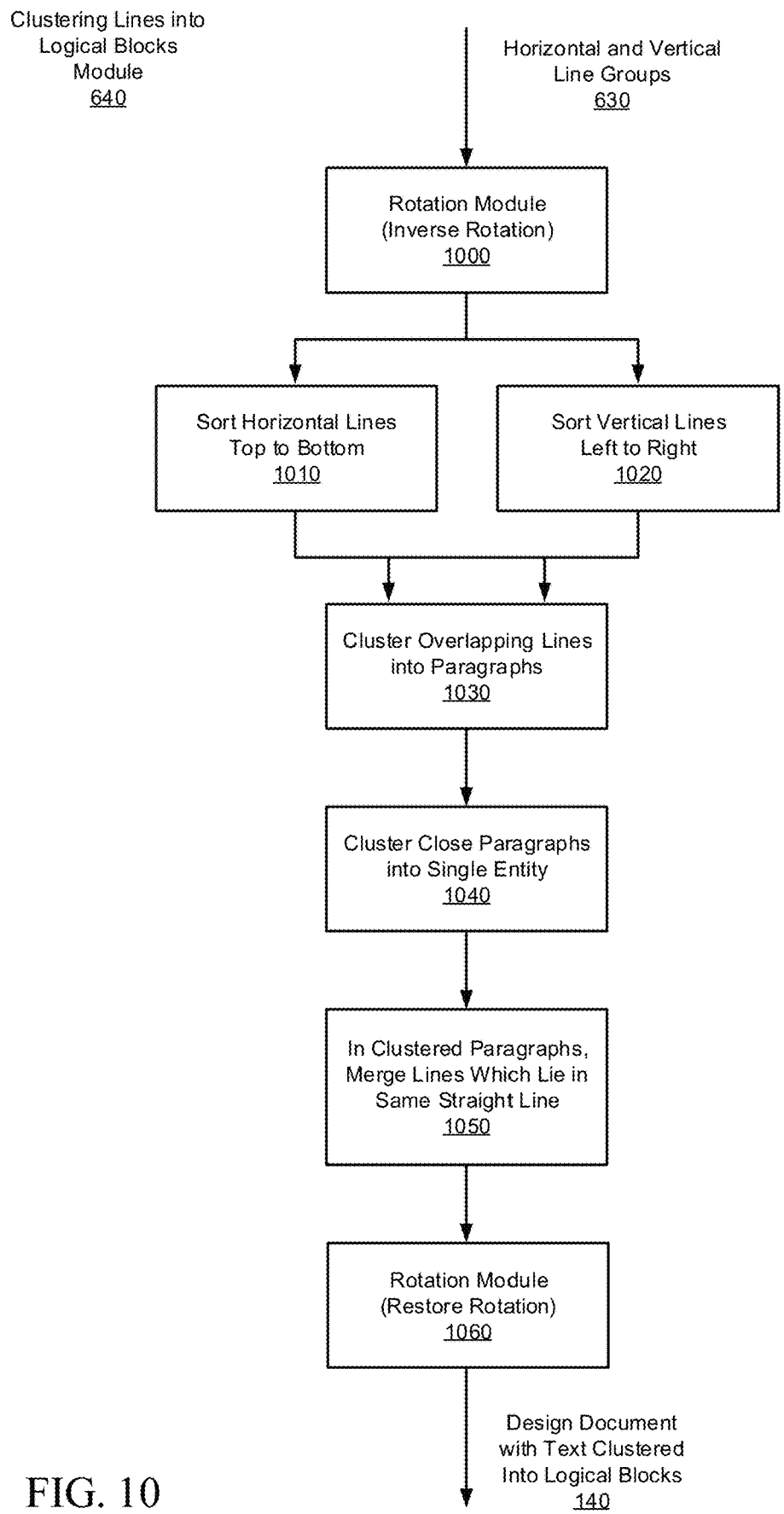
FIG. 10 is a more detailed block diagram of the module in FIG. 6 for clustering lines into logical blocks, configured in accordance with an embodiment of the present disclosure.

FIG. 10 is a more detailed block diagram of the module 640 for clustering lines into logical blocks (e.g., paragraph groupings), configured in accordance with an embodiment of the present disclosure. The module 640 is shown to include an inverse rotation module 1000, line sorting modules 1010 and 1020, cluster modules 1030, 1040, merge module 1050, and a restore rotation module 1060.

Figure 11:
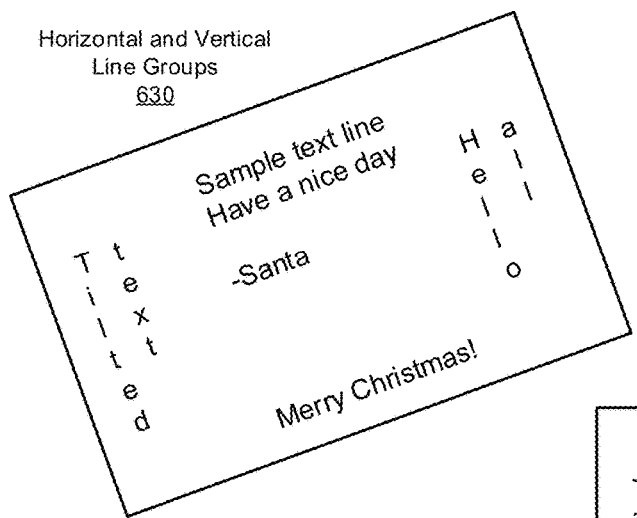
FIG. 11 illustrates examples of line groupings, inverse rotation, and sorting, in accordance with an embodiment of the present disclosure.

The rotation module 1000 is configured to inverse rotate the horizontal and vertical line groupings 630 that have been generated to this point, to correct for their existing rotation and make them parallel, for example, to the x axis of the cartesian plane. FIG. 11 illustrates horizontal and vertical line groups 630 before and after inverse rotation 1000.

The sorting module 1010 is configured to sort the horizontal lines from top to bottom, as shown at 1010 of FIG. 11 (e.g., 1, 2, 3, and 4). The sorting module 1020 is configured to sort the vertical lines left to right, as shown at 1020 of FIG. 11 (e.g., 5, 6, 7, and 8).

The cluster module 1030 is configured to cluster overlapping lines into paragraphs. As shown at 1210 of FIG. 12, horizontal lines 1, 2, 3, and 4 overlap in the vertical dimension 1230, and are therefore candidates from clustering. Lines 1, 2, and 3 are separated by a vertical distance 1240 that is less than a distance threshold and are thus clustered into one paragraph. Line 4, however, is separated by a distance 1250, that is greater than the distance threshold, and thus line 4 becomes a new paragraph. The distance threshold is selected based on font, font size, and text scale. As shown at 1260 of FIG. 12, vertical lines 5, 6, 7, and 8 overlap in the horizontal dimension 1270, and are therefore candidates from clustering. Lines 5 and 6 and lines 7 and 8 are separated by a horizontal distance 1290 that is less than a distance threshold and are thus clustered into two respective paragraphs. Lines 6 and 7, however, are separated by a distance 1280, that is greater than the distance threshold, and thus the two paragraphs are not clustered into one paragraph.

The cluster module 1040 is configured to cluster closely spaced paragraphs into a single entity. Horizontal paragraphs which overlap vertically, within a threshold distance, are clustered together, and vertical paragraphs which overlap horizontally, within a threshold distance, are clustered together. This is illustrated, for example in FIG. 13 where paragraph 1300 is clustered with paragraph 1310 to create clustered paragraph 1320 that wraps around image block 1330.

The merge module 1050 is configured to merge lines (e.g., sentences or sentence fragments, or some other text object chunks or portions separated by an intervening graphic or other object) of the clustered paragraphs which lie in the same straight line. While clustering paragraphs, cases can arise in which the lines of two paragraphs lie in a straight line but are separated by a significant distance. This is illustrated as lines 1350 and 1360 of FIG. 13, which are merged into line 1370. For each clustered paragraph, the text lines within that paragraph are sorted, and if two consecutive lines lie in the same direction and along the same straight line, they are merged into a single text line.

The rotation module 1060 is configured to rotate the logical blocks or paragraphs to restore the angle of rotation of the text lines included in the logical blocks back to their original orientations.

Figure 14:
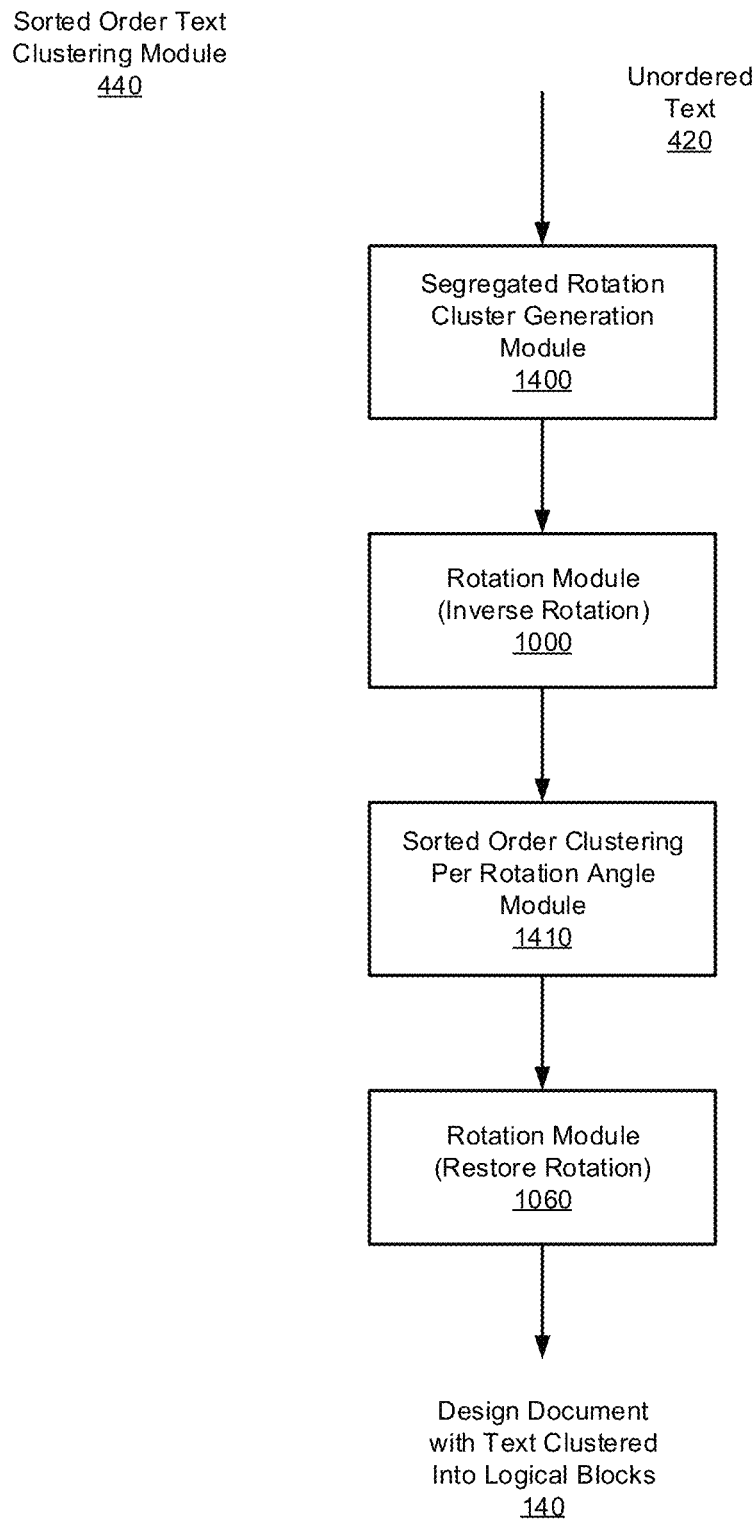
FIG. 14 is a more detailed block diagram of the sorted order text clustering module of FIG. 4, configured in accordance with an embodiment of the present disclosure.

FIG. 14 is a more detailed block diagram of the sorted order text clustering module 440, configured in accordance with an embodiment of the present disclosure. The sorted order text clustering module 440 is configured to cluster text without reliance on any particular order of the received text stream, which is more complex problem and requires a more structured clustering process as will be explained below. The sorted order text clustering module 440 is shown to include a segregated rotation cluster generation module 1400, inverse rotation module 1000, a sorted order clustering per rotation angle module 1410, and restore rotation module 1060.

The segregated rotation cluster generation module 1400 is configured to generate clusters of similarly oriented text blocks. FIG. 15 illustrates examples of these segregated clusters 1500.

Figure 16:
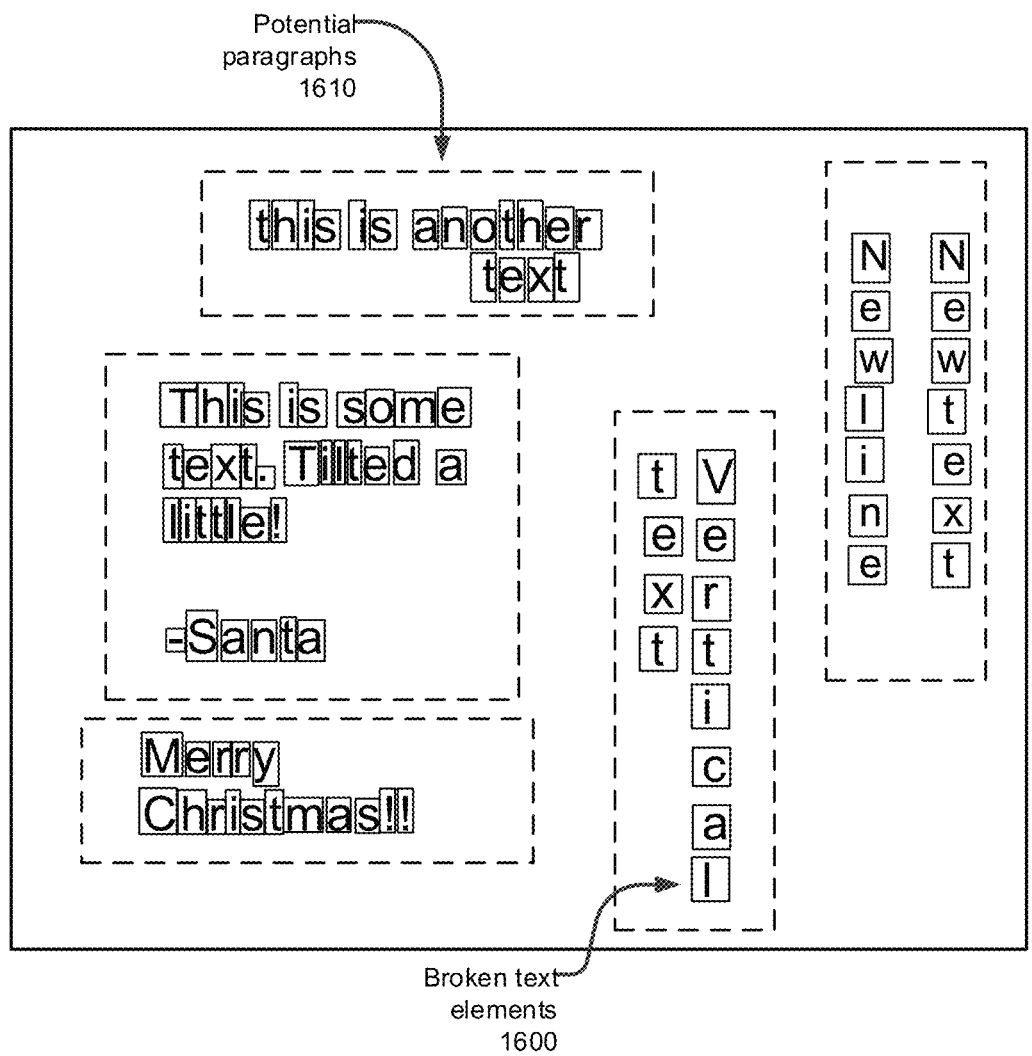
FIG. 16 illustrates a number of potential paragraph clusters, each cluster including a number of broken out text elements, in accordance with an embodiment of the present disclosure.

Inverse rotation module 1000 is configured to inverse rotate the segregated clusters to correct for their existing rotation and make them parallel, for example, to the x axis of the cartesian plane. FIG. 15 illustrates examples of the inverse rotated clusters 1510. The text in these clusters appears to be arranged into several potential paragraphs, but recall that the text elements were received in a random order, so the sequence of text elements is unknown. This is illustrated in FIG. 16 which shows that each text element 1600 has been broken out. Potential paragraph clusters 1610 are indicated by dotted lines.

The module 1410 for sorted order clustering per rotation angle is configured to identify lines within each inverse rotated cluster and cluster them into either horizontal or vertically oriented paragraphs, as will be explained in greater detail below in connection with FIG. 17.

Restore rotation module 1060 is configured to rotate the paragraphs to restore the angle of rotation of the clusters associated with the paragraphs.

Figure 17:
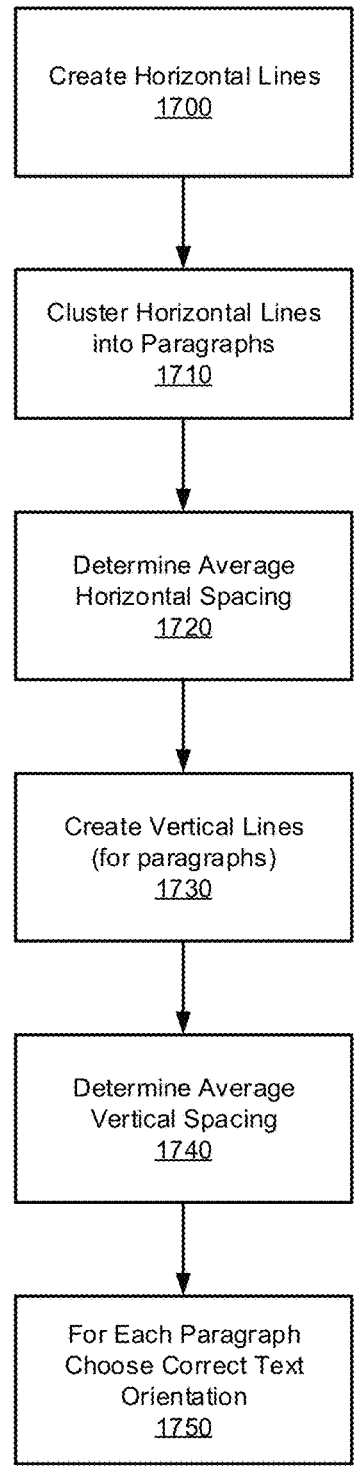
FIG. 17 is a more detailed block diagram of the sorted order clustering per rotation angle module of FIG. 14, configured in accordance with an embodiment of the present disclosure.

FIG. 17 is a more detailed block diagram of the sorted order clustering per rotation angle module 1410, configured in accordance with an embodiment of the present disclosure. The sorted order clustering per rotation angle module 1410 is shown to include a horizontal line creation module 1700, a horizontal line Cluster module 1710, an average horizontal spacing determination module 1720, a vertical line creation module 1730, an average vertical spacing determination module 1740, and a text orientation selection module 1750.

The horizontal line creation module 1700 is configured to generate horizontal lines 1800 within each inverse rotated cluster as illustrated in FIG. 18. The horizontal line generation process as described in greater detail below in connection with FIG. 21.

The horizontal line cluster module 1710 is configured to cluster the generated horizontal lines into horizontal paragraphs 1810. In some embodiments, the clustering of horizontal lines is performed as described previously in connection with cluster module 1030 and FIG. 12. In particular, the clustering may comprise identifying horizontal text lines that overlap vertically 1230 within a first tolerance and that are spaced vertically 1250 within a second tolerance. The first tolerance and second tolerances may be based on font, font size, and text scale associated with the horizontal text lines. The clustering may further include clustering the identified horizontal text lines into paragraphs, clustering the paragraphs that overlap vertically within the first tolerance, and merging the horizontal text lines within the clustered paragraph that share a common horizontal axis.

The average horizontal spacing determination module 1720 is configured to calculate an average horizontal spacing 1815 between the elements of the text blocks included in the horizontal lines that were merged into the horizontal paragraphs.

The vertical line creation module 1730 is configured to generate vertical lines 1820 for each horizontal paragraph within each inverse rotated cluster as illustrated in FIG. 18. The vertical line generation process is described in greater detail below in connection with FIG. 22.

The average vertical spacing determination module 1740 is configured to calculate an average vertical spacing 1825 between the elements of the text blocks included in the horizontal lines that were merged into the horizontal paragraphs.

The text orientation selection module 1750 is configured to choose a horizontal line format if the average horizontal spacing is less than the average vertical spacing, or to otherwise choose a vertical line format. In some embodiments, the choice between horizontal line format and vertical line format may also be based upon which format provides greater order. One example of a suitable measure for order determination is a comparison of the number of horizontal lines to the number of vertical lines. If a count of the number of horizontal lines is less than a count of the number vertical lines, in the horizontal line format may be considered to provide a greater degree of order.

This is illustrated in FIG. 19, which illustrates selection of the correct text orientation. As shown, a horizontal line format 1900 is chosen for the first paragraph 1920, because the average horizontal spacing is less than the average vertical spacing, and the number of horizontal lines is less than the number vertical lines. Similarly, for the second paragraph 1930, the horizontal line format 1900 is chosen for the same reasons. For the third paragraph 1940, the horizontal line format is also chosen for the same reasons. In contrast, vertical line format 1910 is chosen for the fourth paragraph 1950, because the average vertical spacing is less than the average horizontal spacing, and the number of vertical lines is less than the number horizontal lines. Similarly, for the fifth paragraph 1960, the vertical line format is also chosen for the same reasons.

Figure 20:
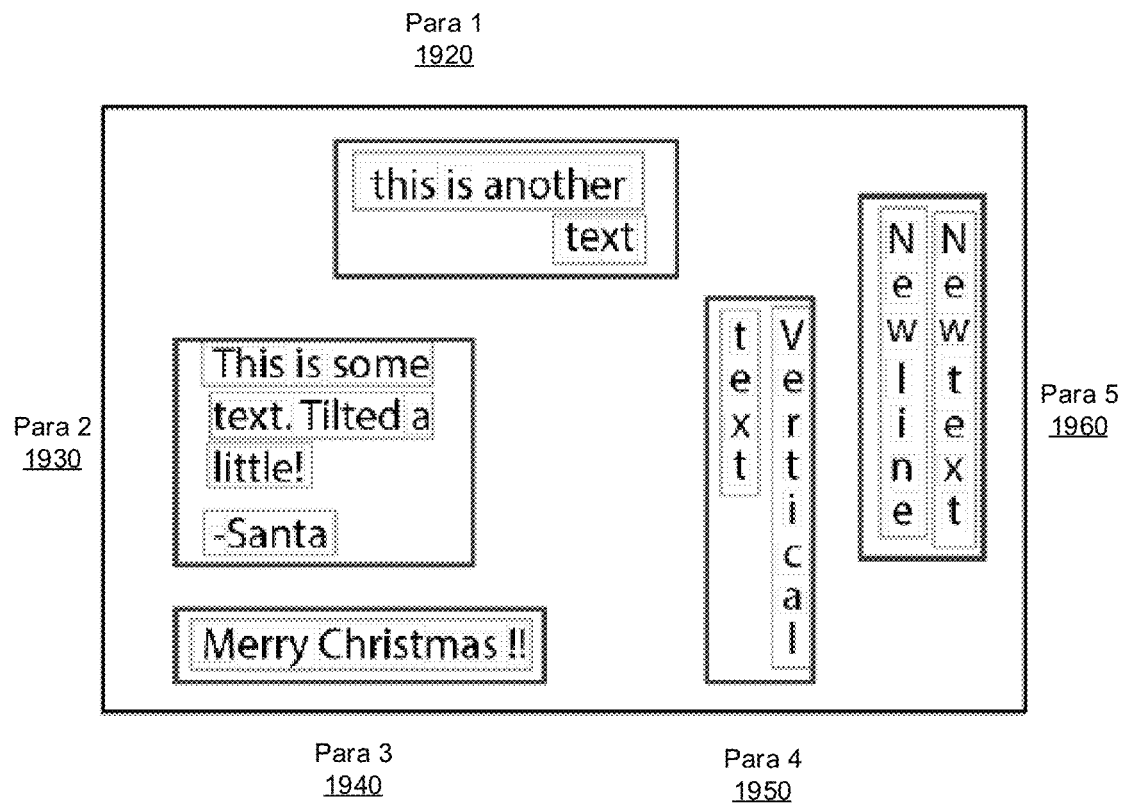
FIG. 20 illustrates examples of clustering of text into logical blocks, in accordance with an embodiment of the present disclosure.

FIG. 20 illustrates the clustering 2000 of text into logical blocks or paragraphs 1920, 1930, 1940, 1950, 1960, resulting from the selection process described above, in accordance with an embodiment of the present disclosure.

FIG. 21 illustrates horizontal line creation 1700, in accordance with an embodiment of the present disclosure. Since the order of the text is unknown, clustering cannot simply begin at any random point in the text, instead a method is disclosed to provide clustering in an ordered fashion as follows. A topmost element 2100 of the text blocks included in the cluster is identified as a starting point. The identification is based on a comparison of the y coordinates of the elements. Next, text blocks 2120, 2130 are identified for consideration as being located within a threshold vertical distance of a horizontal line 2110 passing through the topmost element 2100.

The elements of the identified text blocks are traversed in a right to left order 2140 from the topmost element 2100 up to a leftmost spatial discontinuity. The size of the spatial discontinuity is based on a font size and a text scale associated with the text blocks. The text block elements are then traversed in a left to right order 2150 from the topmost element 2100 up to a rightmost spatial discontinuity. The horizontal line is created to include the text block elements from the leftmost spatial discontinuity to the rightmost spatial discontinuity. In this example, the text block 2130 is rejected for inclusion in the created horizontal line because it is located beyond the spatial discontinuity tolerance 2160. The resulting created line 2170 includes the text block elements "this is another."

Figure 22:
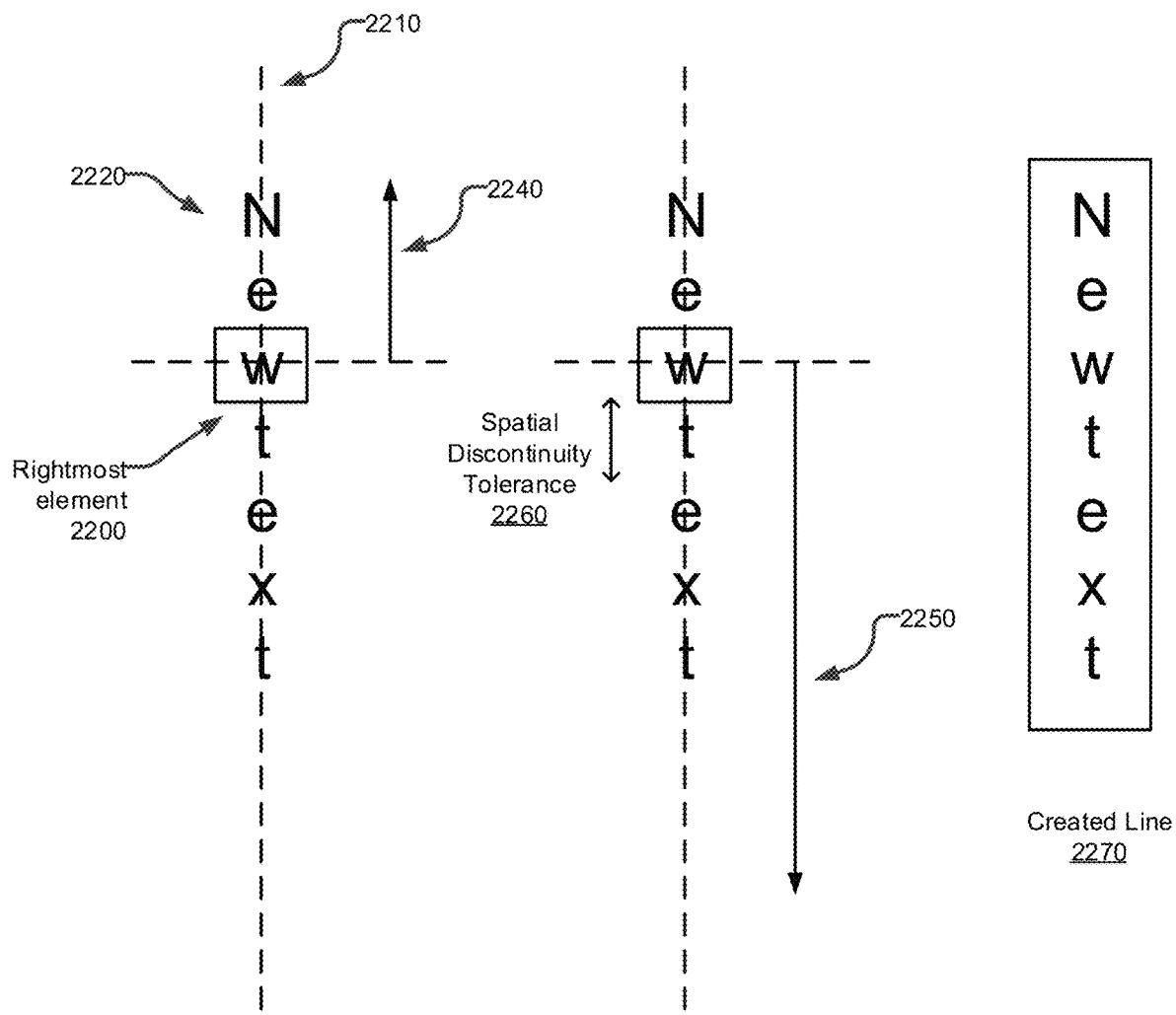
FIG. 22 illustrates examples of vertical line creation, in accordance with an embodiment of the present disclosure.

FIG. 22 illustrates vertical line creation 1730, in accordance with an embodiment of the present disclosure. A rightmost element 2200 of the text blocks included in the cluster is identified as a starting point. The identification is based on a comparison of the x coordinates of the elements. Next, elements of text block 2220 are identified for consideration as being located within a threshold horizontal distance of a vertical line 2210 passing through the rightmost element 2200.

The elements of the identified text block are traversed in a bottom to top order 2240 from the rightmost element 2200 up to a topmost spatial discontinuity. The size of the spatial discontinuity is based on a font size and a text scale associated with the text block. The text block elements are then traversed in a top to bottom order 2250 from the rightmost element 2200 down to a bottommost spatial discontinuity. The vertical line is created to include the text block elements from the topmost spatial discontinuity to the bottommost spatial discontinuity. In this example, all of the elements of text block 2220 are accepted for inclusion in the created vertical line because they are located within the spatial discontinuity tolerance 2260. The resulting created line 2270 includes the text block elements "Newtext."

Methodology

Figure 23:
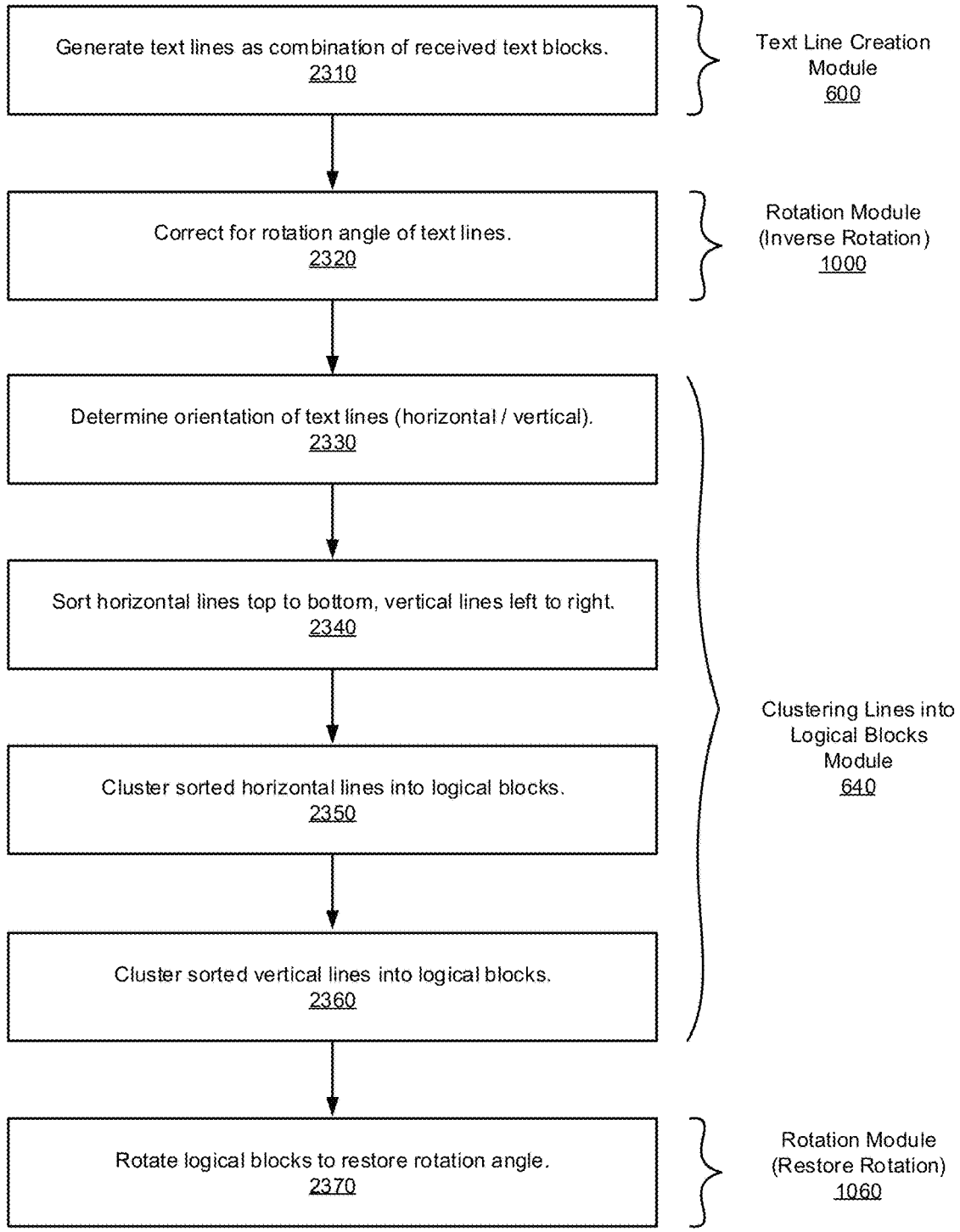
FIG. 23 is a flowchart illustrating an example method for variational text clustering, in accordance with an embodiment of the present disclosure.
Figure 24:
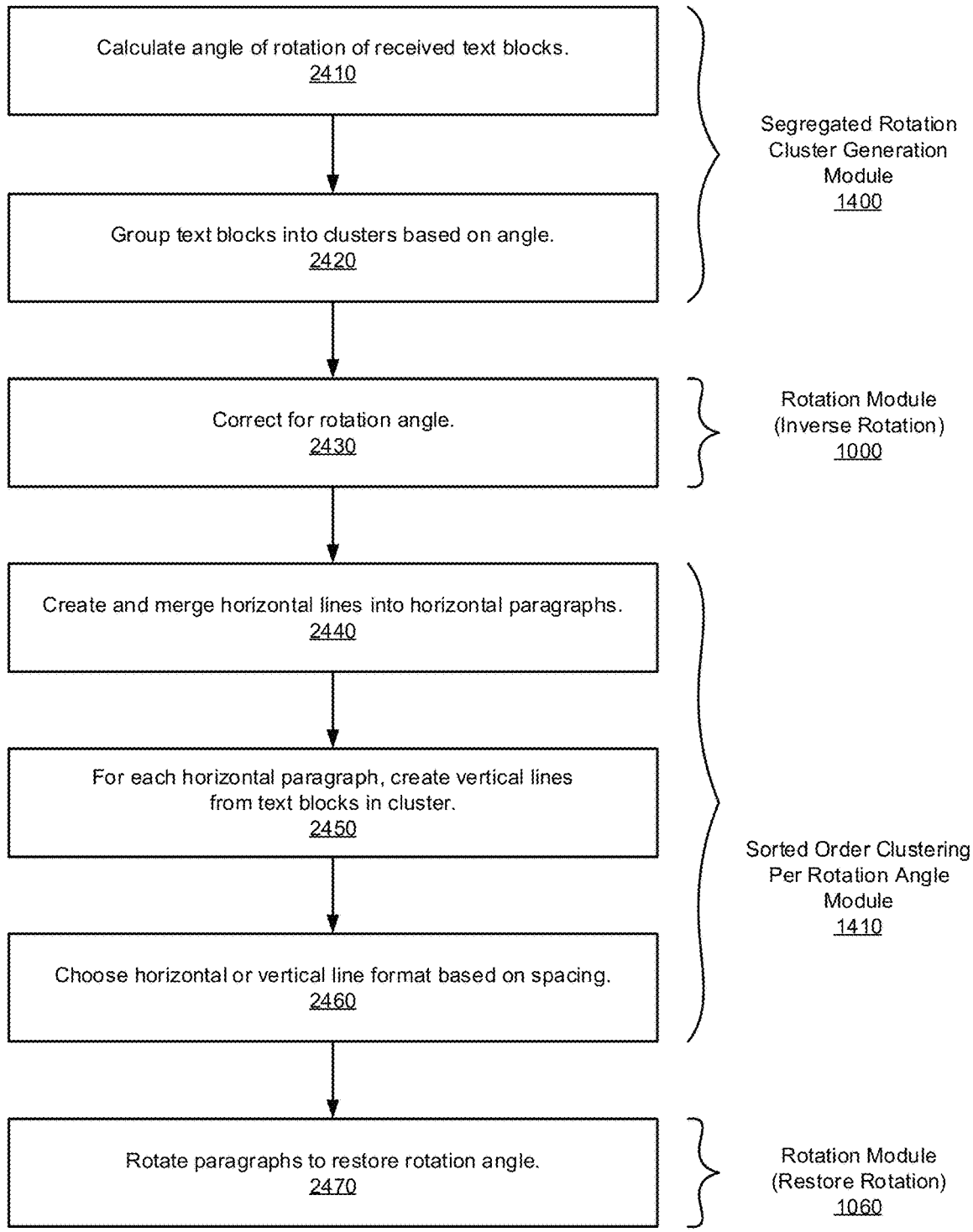
FIG. 24 is a flowchart illustrating an example method for variational text clustering, in accordance with another embodiment of the present disclosure.

FIGS. 23 and 24 are flowcharts illustrating methods 2300 and 2400 for variational text clustering, in accordance with an embodiment of the present disclosure. As can be seen, the method is described with reference to the configuration of variational text clustering system 100 of FIGS. 1, 4, 6, 10, 14, and 17. However, any number of module configurations can be used to implement the method, as will be appreciated in light of this disclosure. Further note that the various functions depicted in the method do not need to be assigned to the specific example modules shown. To this end, the example methodology depicted is provided to give one example embodiment and is not intended to limit the methodology to any particular physical or structural configuration; rather, the clustering techniques provided herein can be used with a number of architectures and platforms and variations, as will be appreciated.

The method 2300, for clustering of text received in sequential reading order, commences at operation 2310, by generating text lines as a combination of two or more of the received text blocks based on evaluation of an alignment cost function and a proximity measurement applied to the text blocks. The received text blocks comprise elements including one or more glyphs, characters, and/or words.

The method continues, at operation 2320, by calculating an angle of rotation for each of the generated text lines and rotating (e.g., inverse rotating) the generated text lines to correct for the angle of rotation.

At operation 2330, an orientation of the generated text lines is determined to be horizontal or vertical. In some embodiments, the orientation is determined by calculating an average angle of rotation of characters of the generated text line and determining the orientation as vertical if the average angle of rotation of the characters differs from the angle of rotation of the generated text line by approximately ninety degrees (within a tolerance range), otherwise determining the orientation as horizontal. In some embodiments, the tolerance range may be on the order of +/−5 degrees.

At operation 2340, horizontal oriented text lines are sorted from top to bottom and the vertical oriented text lines are sorted from left to right. At operation 2350, the sorted horizontal oriented text lines are clustered into logical blocks. At operation 2360, the sorted vertical oriented text lines are clustered into logical blocks. In some embodiments, for example to handle text wrapping scenarios, logical blocks that overlap vertically within a tolerance or that overlap horizontally within the tolerance are clustered. In some embodiments, text lines within the clustered logical block which share a common horizontal axis, or a common vertical axis are merged.

At operation 2370, the logical blocks are rotated to restore the angle of rotation of the text lines included in the logical blocks.

The method 2400, for clustering of text received in an arbitrary order (e.g., unordered), commences at operation 2410, by calculating an angle of rotation of received text blocks. The received text blocks comprise elements including one or more glyphs, characters, and/or words.

The method continues, at operation 2420, by grouping the text blocks into clusters based on the angle of rotation. At operation 2430, the clusters are rotated (e.g., inverse rotated) to correct for the angle of rotation associated with the cluster.

At operation 2440, for each cluster, horizontal lines are created, comprising the text blocks included in the cluster, and the horizontal lines are merged into horizontal paragraphs. An average horizontal spacing between the elements of the text blocks included in the horizontal lines is determined.

At operation 2450, for each horizontal paragraph, vertical lines are created, comprising the text blocks included in the cluster. An average vertical spacing between the elements of the text blocks included in the vertical lines is determined.

At operation 2460, a horizontal line format is chosen if the average horizontal spacing is less than the average vertical spacing, otherwise a vertical line format is chosen. In some embodiments, the choice of horizontal line format is further based on a determination that a count of the number of horizontal lines is less than a count of the number of vertical lines. In some embodiments, for example to handle text wrapping scenarios, logical blocks that overlap vertically within a tolerance are clustered, and text lines within the clustered logical block which share a common horizontal axis are merged At operation 2470, the paragraphs are rotated to restore the angle of rotation of the clusters associated with the paragraphs.

Example Platform

Figure 25:
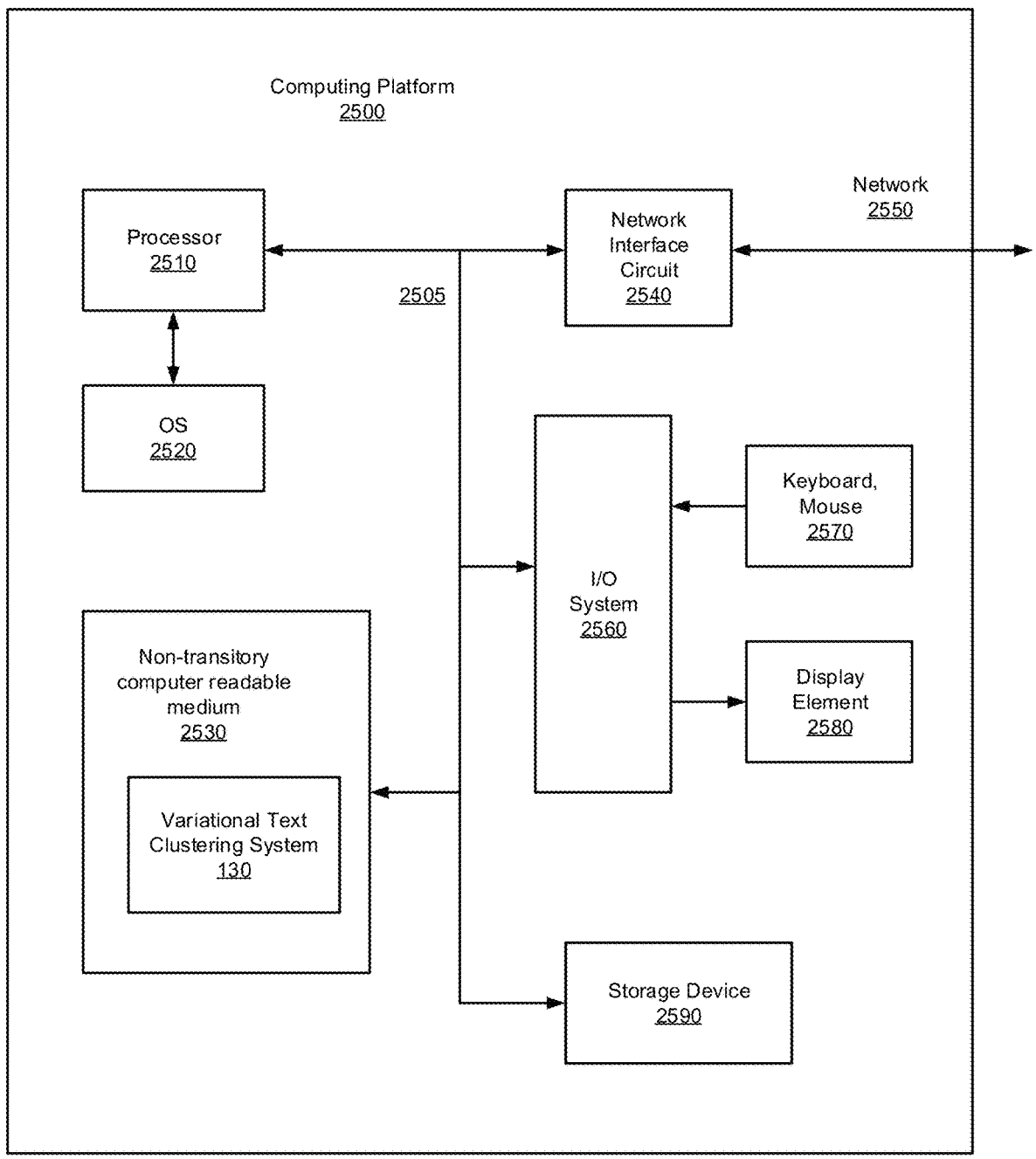
FIG. 25 is a block diagram schematically illustrating a computing platform configured to perform any of the techniques as variously described in this disclosure, configured in accordance with an embodiment of the present disclosure.

FIG. 25 is a block diagram schematically illustrating a computing platform 2500 configured to perform any of the techniques as variously described in this disclosure, configured in accordance with an embodiment of the present disclosure. For example, in some embodiments, the variational text clustering system 130 of FIG. 1, or any portions thereof as illustrated in FIGS. 1, 4, 6, 10, 14, and 17, and the methodologies of FIGS. 23 and 24, or any portions thereof, are implemented in the computing platform 2500. In some embodiments, the computing platform 2500 is a computer system, such as a workstation, desktop computer, server, laptop, handheld computer, tablet computer (e.g., the iPad tablet computer), mobile computing or communication device (e.g., the iPhone mobile communication device, the Android mobile communication device, and the like), or other form of computing device that has sufficient processor power and memory capacity to perform the operations described in this disclosure. In some embodiments, a distributed computational system is provided comprising a plurality of such computing devices.

The computing platform 2500 includes one or more storage devices 2590 and/or non-transitory computer-readable media 2530 having encoded thereon one or more computer-executable instructions or software for implementing techniques as variously described in this disclosure. In some embodiments, the storage devices 2590 include a computer system memory or random-access memory, such as a durable disk storage (e.g., any suitable optical or magnetic durable storage device, including RAM, ROM, Flash, USB drive, or other semiconductor-based storage medium), a hard-drive, CD-ROM, or other computer readable media, for storing data and computer-readable instructions and/or software that implement various embodiments as taught in this disclosure. In some embodiments, the storage device 2590 includes other types of memory as well, or combinations thereof. In one embodiment, the storage device 2590 is provided on the computing platform 2500. In another embodiment, the storage device 2590 is provided separately or remotely from the computing platform 2500. The non-transitory computer-readable media 2530 include, but are not limited to, one or more types of hardware memory, non-transitory tangible media (for example, one or more magnetic storage disks, one or more optical disks, one or more USB flash drives), and the like. In some embodiments, the non-transitory computer-readable media 2530 included in the computing platform 2500 store computer-readable and computer-executable instructions or software for implementing various embodiments. In one embodiment, the computer-readable media 2530 are provided on the computing platform 2500. In another embodiment, the computer-readable media 2530 are provided separately or remotely from the computing platform 2500.

The computing platform 2500 also includes at least one processor 2510 for executing computer-readable and computer-executable instructions or software stored in the storage device 2590 and/or non-transitory computer-readable media 2530 and other programs for controlling system hardware. In some embodiments, virtualization is employed in the computing platform 2500 so that infrastructure and resources in the computing platform 2500 are shared dynamically. For example, a virtual machine is provided to handle a process running on multiple processors so that the process appears to be using only one computing resource rather than multiple computing resources. In some embodiments, multiple virtual machines are used with one processor.

As can be further seen, a bus or interconnect 2505 is also provided to allow for communication between the various components listed above and/or other components not shown. Computing platform 2500 can be coupled to a network 2550 (e.g., a local or wide area network such as the internet), through network interface circuit 2540 to allow for communications with other computing devices, platforms, resources, clients, and Internet of Things (IoT) devices.

In some embodiments, a user interacts with the computing platform 2500 through an input/output system 2560 that interfaces with devices such as a keyboard and mouse 2570 and/or a display element (screen/monitor) 2580. The keyboard and mouse may be configured to provide a user interface to accept user input and guidance, and to otherwise control the variational text clustering system 130. The display element may be configured, for example, to display the results of processing using the disclosed techniques. In some embodiments, the computing platform 2500 includes other I/O devices (not shown) for receiving input from a user, for example, a pointing device or a touchpad, etc., or any suitable user interface. In some embodiments, the computing platform 2500 includes other suitable conventional I/O peripherals. The computing platform 2500 can include and/or be operatively coupled to various suitable devices for performing one or more of the aspects as variously described in this disclosure.

In some embodiments, the computing platform 2500 runs an operating system (OS) 2520, such as any of the versions of Microsoft Windows operating systems, the different releases of the Unix and Linux operating systems, any version of the MacOS for Macintosh computers, any embedded operating system, any real-time operating system, any open source operating system, any proprietary operating system, any operating systems for mobile computing devices, or any other operating system capable of running on the computing platform 2500 and performing the operations described in this disclosure. In one embodiment, the operating system runs on one or more cloud machine instances.

As will be appreciated in light of this disclosure, the various modules and components of the system, as shown in FIGS. 1, 4, 6, 10, 14, and 17, can be implemented in software, such as a set of instructions (e.g., HTML, XML, C, C++, object-oriented C, JavaScript, Java, BASIC, etc.) encoded on any computer readable medium or computer program product (e.g., hard drive, server, disc, or other suitable non-transient memory or set of memories), that when executed by one or more processors, cause the various methodologies provided in this disclosure to be carried out. It will be appreciated that, in some embodiments, various functions and data transformations performed by the computing system, as described in this disclosure, can be performed by similar processors in different configurations and arrangements, and that the depicted embodiments are not intended to be limiting. Various components of this example embodiment, including the computing platform 2500, can be integrated into, for example, one or more desktop or laptop computers, workstations, tablets, smart phones, game consoles, set-top boxes, or other such computing devices. Other componentry and modules typical of a computing system, such as, for example a co-processor, a processing core, a graphics processing unit, a touch pad, a touch screen, etc., are not shown but will be readily apparent.

In other embodiments, the functional components/modules are implemented with hardware, such as gate level logic (e.g., FPGA) or a purpose-built semiconductor (e.g., ASIC). Still other embodiments are implemented with a microcontroller having a number of input/output ports for receiving and outputting data, and a number of embedded routines for carrying out the functionality described in this disclosure. In a more general sense, any suitable combination of hardware, software, and firmware can be used, as will be apparent.

Further Example Embodiments

Numerous example embodiments will be apparent, and features described herein can be combined in any number of configurations.

Example 1 is a computer program product including one or more non-transitory machine-readable mediums encoded with instructions that when executed by one or more processors cause a process to be carried out for clustering of text exported from a first digital document having a first format into a second digital document having a second format different than the first format, the process comprising: receiving in the second digital document a stream of text blocks exported from the first digital document, the text blocks including first and second text blocks that are part of a text object of the first digital document; in response to the stream of text blocks being received in sequential reading order, executing a first clustering method to determine if the first and second text blocks belong to a logical block corresponding to the text object; and in response to the stream of text blocks being received in non-sequential arbitrary order, executing a second clustering method to determine if the first and second text blocks belong to the logical block corresponding to the text object, the second clustering method different from the first clustering method; wherein one or both of the first and second clustering methods includes measuring the distance between the first and second text blocks, and in response to that distance being less than a distance threshold, determining that the first and second text blocks belong to the logical block corresponding to the text object. The one or more non-transitory machine-readable mediums can be any physical storage medium, such as read-only memory (ROM), random access memory (RAM), cache memory, embedded memory, disc drive, solid state memory, or any other type of memory.

Example 2 includes the subject matter of Example 1, the process further comprising: heuristically determining if the stream of text blocks is received in sequential reading order or non-sequential arbitrary order.

Example 3 includes the subject matter of Example 2, wherein heuristically determining if the stream of text blocks is received in sequential reading order or non-sequential arbitrary order includes one or more of: interrogating a grid coordinate accompanying each text block; in response to determining that same orientation text lines are populating in the second digital document in a sequential fashion based on said interrogation, determining that the stream of text blocks is received in sequential reading order; in response to determining that text lines are populating in the second digital document in a random checkerboard fashion based on said interrogation, determining that the stream of text blocks is received in non-sequential arbitrary order; and performing a grammatical analysis of at least a portion of the received stream of text blocks to detect grammatical errors, and in response to a grammatical error rate exceeding an error threshold, determining that the stream of text blocks is received in non-sequential arbitrary order.

Example 4 includes the subject matter of any of Examples 1 through 3, wherein the text blocks further include third and fourth text blocks that are part of the text object, and wherein the distance threshold is a first distance threshold, and wherein one or both of the first and second clustering methods includes: generating a first text line that includes the first text block and the third text block based on a proximity measurement to determine that the distance between the first text block and the third text block is within a second distance threshold; and generating a second text line that includes the second text block and the fourth text block based on a proximity measurement to determine that the distance between the second text block and the fourth text block is within a third distance threshold; wherein measuring the distance between the first and second text blocks and determining that the first and second text blocks belong to the logical block corresponding to the text object include measuring the distance between the first and second text lines and in response to that distance being less than the first distance threshold, determining that the first and second text lines belong to the logical block corresponding to the text object; wherein each of the first, second, and third distance thresholds may be the same or different from one another.

Example 5 includes the subject matter of any of Examples 1 through 4, wherein: the stream of text blocks is received in sequential reading order, the sequential reading order progressing from left to right and top to bottom for horizontal oriented text blocks, and top to bottom and left to right for vertical oriented text blocks; or the stream of text blocks is received in non-sequential arbitrary order, the non-sequential arbitrary order independent of the sequential reading order.

Example 6 includes the subject matter of Example 5, wherein the text blocks comprise one or more glyphs, characters, and/or words.

Example 7 includes the subject matter of any of Examples 1 through 6, wherein the first clustering method includes: generating text lines as a combination of two or more of the text blocks based on evaluation of an alignment cost function and a proximity measurement applied to the text blocks; calculating an angle of rotation of the generated text lines; rotating the generated text lines to correct for the angle of rotation; determining an orientation of the generated text lines, the orientation one of horizontal or vertical; sorting the horizontal oriented text lines from top to bottom; sorting the vertical oriented text lines from left to right; clustering the sorted horizontal oriented text lines into logical blocks; clustering the sorted vertical oriented text lines into logical blocks; and rotating the logical blocks to restore the angle of rotation of the text lines included in the logical blocks.

Example 8 includes the subject matter of Example 7, wherein generating text lines comprises: evaluating the alignment cost function as a distance between a first axis, connecting a start point and an end point of the first text block, and a second axis, connecting a start point and an end point of the second text block; evaluating the proximity measurement as a distance between the end point of the first text block and the start point of the second text block; generating a first text line comprising the first text block; in response to the alignment cost function being less than a first threshold and the proximity measurement being less than a second threshold, concatenating the second text block to the first text line; and in response to the alignment cost function not being less than the first threshold and/or the proximity measurement not being less than the second threshold, generating a second text line comprising the second text block.

Example 9 includes the subject matter of Example 7 or 8, wherein determining the orientation of the generated text line comprises: calculating an average angle of rotation of characters of the generated text line; in response to the average angle of rotation of the characters differing from the angle of rotation of the generated text line by 90 degrees within a tolerance range, determining the orientation as vertical; and in response to the average angle of rotation of the characters not differing from the angle of rotation of the generated text line by 90 degrees within the tolerance range, determining the orientation as horizontal.

Example 10 includes the subject matter of any of Examples 7 through 9, wherein clustering the sorted horizontal oriented text lines comprises: identifying text lines that overlap vertically within a first tolerance and that are spaced vertically within a second tolerance, the first tolerance and the second tolerance based on a font size associated with the text lines; clustering the identified text lines into logical blocks; clustering the logical blocks that overlap vertically within the first tolerance; and merging text lines within the clustered logical block which share a common horizontal axis. In addition, clustering the sorted vertical oriented text lines comprises: identifying text lines that overlap horizontally within a first tolerance and that are spaced horizontally within a second tolerance, the first tolerance and the second tolerance based on a font size associated with the text lines; clustering the identified text lines into logical blocks; clustering the logical blocks that overlap horizontally within the first tolerance; and merging text lines within the clustered logical block which share a common vertical axis.

Example 11 includes the subject matter of any of Examples 1 through 10, wherein the second clustering method includes: receiving a plurality of text blocks, the text blocks comprising elements including one or more of glyphs, characters, and/or words; calculating an angle of rotation of the text blocks; grouping the text blocks into clusters based on the angle of rotation; and rotating the clusters to correct for the angle of rotation associated with the cluster, such that all the rotated clusters have a horizontal orientation. For each cluster, the second cluster method further includes: creating horizontal lines comprising the text blocks included in the cluster; clustering the horizontal lines into horizontal paragraphs; and determining an average horizontal spacing between the elements of the text blocks included in the horizontal lines. In addition, for each horizontal paragraph, the second cluster method further includes: creating vertical lines comprising the text blocks included in the horizontal paragraph; determining an average vertical spacing between the elements of the text blocks included in the vertical lines; and choosing a horizontal line format if the average horizontal spacing is less than the average vertical spacing, otherwise choose a vertical line format. The second cluster method further includes rotating the paragraphs to restore the angle of rotation of the clusters associated with the paragraphs, according to some such embodiments.

Example 12 is a computer program product including one or more non-transitory machine-readable mediums encoded with instructions that when executed by one or more processors cause a process to be carried out for clustering of text, the process comprising: receiving a plurality of text blocks, the text blocks comprising elements including one or more of glyphs, characters, and/or words; calculating an angle of rotation of the text blocks; grouping the text blocks into clusters based on the angle of rotation; and rotating the clusters to correct for the angle of rotation associated with the cluster. For each cluster, the process further comprises: creating horizontal lines comprising the text blocks included in the cluster; clustering the horizontal lines into horizontal paragraphs; and determining an average horizontal spacing between the elements of the text blocks included in the horizontal lines. In addition, for each horizontal paragraph, the process further includes creating vertical lines comprising the text blocks included in the horizontal paragraph; determining an average vertical spacing between the elements of the text blocks included in the vertical lines; and choosing a horizontal line format if the average horizontal spacing is less than the average vertical spacing, otherwise choose a vertical line format. The process further includes rotating the paragraphs to restore the angle of rotation of the clusters associated with the paragraphs.

Example 13 includes the subject matter of Example 12, wherein creating horizontal lines comprises: identifying a topmost element of the text blocks included in the cluster; identify text blocks located within a threshold vertical distance of a horizontal line passing through the topmost element; traverse the identified text blocks in a right to left order from the identified topmost element up to a leftmost spatial discontinuity, the spatial discontinuity based on a font size and a text scale associated with the text blocks; traverse the identified text blocks in a left to right order from the identified topmost element up to a rightmost spatial discontinuity; and create the horizontal line to include the text block from the leftmost spatial discontinuity to the rightmost spatial discontinuity. In addition, creating vertical lines comprises: identifying a rightmost element of the text blocks included in the cluster; identify text blocks located within a threshold horizontal distance of a vertical line passing through the rightmost element; traverse the identified text blocks in a bottom to top order from the identified rightmost element up to a topmost spatial discontinuity, the spatial discontinuity based on a font size and a text scale associated with the text blocks; traverse the identified text blocks in a top to bottom order from the identified rightmost element up to a bottommost spatial discontinuity; and create the vertical line to include the text block from the topmost spatial discontinuity to the bottommost spatial discontinuity.

Example 14 includes the subject matter of Example 12 or 13, wherein clustering the horizontal lines into horizontal paragraphs comprises: identifying horizontal text lines that overlap vertically within a first tolerance and that are spaced vertically within a second tolerance, the first tolerance and the second tolerance based on a font size associated with the horizontal text lines; clustering the identified horizontal text lines into logical blocks; clustering the logical blocks that overlap vertically within the first tolerance; and merging the horizontal text lines within the clustered logical block which share a common horizontal axis.

Example 15 includes the subject matter of any of Examples 12 through 14, wherein choosing the horizontal line format is further based on a determination that a count of the number of horizontal lines is less than a count of the number of vertical lines.

Example 16 is a system for clustering of text, the system comprising: means for determining if text blocks received in an input stream are received in sequential reading order or non-sequential arbitrary order, the text blocks exported from a digital document and including first and second text blocks that are part of a text object of a digital document; a first clustering means to determine if the first and second text blocks belong to a logical block corresponding to the text object, in response to text blocks of the input stream being received in sequential reading order; and a second clustering means to determine if the first and second text blocks belong to a logical block corresponding to the text object, in response to text blocks of the input stream being received in non-sequential arbitrary order, the second clustering means different from the first clustering means. Note that each of these means can be, for instance, instructions executing on one or more processors to carry out the recited function. Alternatively, each of these means can be, for instance, implemented in hardware configured to carry out the recited function, such a field programmable gate array (FPGA) or purpose-built semiconductor, or embedded routines executing on the processor of a microcontroller. Numerous such means will be appreciated in light of this disclosure.

Example 17 includes the subject matter of Example 16, wherein one or both of the first and second clustering means is configured to measure the distance between the first and second text blocks, and in response to that distance being less than a distance threshold, determine that the first and second text blocks belong to the logical block corresponding to the text object.

Example 18 includes the subject matter of Example 16 or 17, wherein the digital document is a first digital document having a first format, and the text blocks are exported from the first digital document to a second digital document having a second format different from the first format, and the means for determining if the text blocks received in the input stream are received in sequential reading order or non-sequential arbitrary order includes one or more processors configured to: interrogate grid coordinates associated with text blocks; in response to determining that same orientation text lines are populating in the second digital document in a sequential fashion based on said interrogation, determine that the stream of text blocks is received in sequential reading order; and in response to determining that text lines are populating in the second digital document in a random checkerboard fashion based on said interrogation, determine that the stream of text blocks is received in non-sequential arbitrary order.

Example 19 includes the subject matter of any of Examples 16 through 18, wherein the first clustering means includes one or more processors configured to: generate text lines as a combination of two or more of the text blocks based on evaluation of an alignment cost function and a proximity measurement applied to the text blocks; calculate an angle of rotation of the generated text lines; rotate the generated text lines to correct for the angle of rotation; determine an orientation of the generated text lines, the orientation one of horizontal or vertical; sort the horizontal oriented text lines from top to bottom; sort the vertical oriented text lines from left to right; cluster the sorted horizontal oriented text lines into logical blocks; cluster the sorted vertical oriented text lines into logical blocks; and rotate the logical blocks to restore the angle of rotation of the text lines included in the logical blocks.

Example 20 includes the subject matter of any of Examples 16 through 19, wherein the second clustering means includes one or more processors configured to: receive a plurality of text blocks, the text blocks comprising elements including one or more of glyphs, characters, and/or words; calculate an angle of rotation of the text blocks; group the text blocks into clusters based on the angle of rotation; and rotate the clusters to correct for the angle of rotation associated with the cluster, such that all the rotated clusters have a horizontal orientation. For each cluster, the one or more processors are further configured to: create horizontal lines comprising the text blocks included in the cluster; cluster the horizontal lines into horizontal paragraphs; and determine an average horizontal spacing between the elements of the text blocks included in the horizontal lines. In addition, for each horizontal paragraph, the one or more processors are further configured to: create vertical lines comprising the text blocks included in the horizontal paragraph; determine an average vertical spacing between the elements of the text blocks included in the vertical lines; and choose a horizontal line format if the average horizontal spacing is less than the average vertical spacing, otherwise choose a vertical line format. In addition, the one or more processors are further configured to rotate the paragraphs to restore the angle of rotation of the clusters associated with the paragraphs.

The foregoing description of example embodiments of the disclosure has been presented for the purposes of illustration and description. It is not intended to be exhaustive or to limit the disclosure to the precise forms disclosed. Many modifications and variations are possible in light of this disclosure. It is intended that the scope of the disclosure be limited not by this detailed description, but rather by the claims appended hereto.

What is claimed is:

1. A computer program product including one or more non-transitory machine-readable mediums encoded with instructions that when executed by one or more processors cause a process to be carried out for clustering of text exported from a first digital document having a first format into a second digital document having a second format different than the first format, the process comprising:

receiving in the second digital document a stream of text blocks exported from the first digital document, the text blocks including first and second text blocks that are part of a text object of the first digital document;

in response to the stream of text blocks being received in sequential reading order, executing a first clustering method to determine if the first and second text blocks belong to a logical block corresponding to the text object; and in response to the stream of text blocks being received in non-sequential arbitrary order, executing a second clustering method to determine if the first and second text blocks belong to the logical block corresponding to the text object, the second clustering method different from the first clustering method;

wherein one or both of the first and second clustering methods includes measuring a distance between the first and second text blocks, and in response to that distance being less than a distance threshold, determining that the first and second text blocks belong to the logical block corresponding to the text object; and wherein the first clustering method includes:
  generating text lines as a combination of two or more of the text blocks in the stream of text blocks based on evaluation of an alignment cost function and a proximity measurement applied to the two or more text blocks;
  calculating an angle of rotation of the generated text lines;
  rotating the generated text lines to correct for the angle of rotation;
  determining an orientation of the generated text lines, the orientation one of horizontal oriented text lines or vertical oriented text lines;
  sorting the horizontal oriented text lines from top to bottom;
  sorting the vertical oriented text lines from left to right;
  clustering the sorted horizontal oriented text lines into logical blocks of horizontal text;
  clustering the sorted vertical oriented text lines into logical blocks of vertical text; and
  rotating at least one logical block from amongst the logical blocks of horizontal text and the logical blocks of vertical text to restore the angle of rotation of the text lines included in the rotated at least one logical block.

2. The computer program product of claim 1, the process further comprising:
  heuristically determining if the stream of text blocks is received in sequential reading order or non-sequential arbitrary order.

3. The computer program product of claim 2, wherein heuristically determining if the stream of text blocks is received in sequential reading order or non-sequential arbitrary order includes one or more of:
  interrogating a grid coordinate accompanying each text block, and
    in response to determining that same orientation text lines are populating in the second digital document in a sequential fashion based on interrogating the grid coordinates, determining that the stream of text blocks is received in sequential reading order, and
    in response to determining that text lines are populating in the second digital document in a random checkerboard fashion based on interrogating the grid coordinates, determining that the stream of text blocks is received in non-sequential arbitrary order; and
  performing a grammatical analysis of at least a portion of the received stream of text blocks to detect grammatical errors, and in response to a grammatical error rate exceeding an error threshold, determining that the stream of text blocks is received in non-sequential arbitrary order.

4. The computer program product of claim 1, wherein the text blocks in the stream of text blocks further include third and fourth text blocks that are part of the text object, and wherein the distance threshold is a first distance threshold, and wherein one or both of the first and second clustering methods includes:
  generating a first text line that includes the first text block and the third text block based on the proximity measurement to determine that a distance between the first text block and the third text block is within a second distance threshold; and
  generating a second text line that includes the second text block and the fourth text block based on the proximity measurement to determine that a distance between the second text block and the fourth text block is within a third distance threshold;
  wherein measuring the distance between the first and second text blocks and determining that the first and second text blocks belong to the logical block corresponding to the text object includes measuring a distance between the first and second text lines and in response to that distance being less than the first distance threshold, determining that the first and second text lines belong to the logical block corresponding to the text object;
  wherein each of the first, second, and third distance thresholds may be equal to or different from one another.

5. The computer program product of claim 1, wherein:
  the sequential reading order progresses from left to right and top to bottom for horizontal oriented text blocks, and top to bottom and left to right for vertical oriented text blocks; or
  the non-sequential arbitrary order is independent of the sequential reading order.

6. The computer program product of claim 1, wherein generating text lines comprises:
  evaluating the alignment cost function as a distance between a first axis, connecting a start point and an end point of the first text block, and a second axis, connecting a start point and an end point of the second text block;
  evaluating the proximity measurement as a distance between the end point of the first text block and the start point of the second text block;
  generating a first text line comprising the first text block;
  in response to the alignment cost function being less than a first threshold and the proximity measurement being less than a second threshold, concatenating the second text block to the first text line; and
  in response to at least one of (a) the alignment cost function not being less than the first threshold and (b) the proximity measurement not being less than the second threshold, generating a second text line comprising the second text block.

7. The computer program product of claim 1, wherein determining the orientation of the generated text line comprises:
  calculating an average angle of rotation of characters of the generated text line;
  in response to the average angle of rotation of the characters differing from the angle of rotation of the generated text line by 90 degrees within a tolerance range, determining the orientation as vertical; and in response to the average angle of rotation of the characters not differing from the angle of rotation of the generated text line by 90 degrees within the tolerance range, determining the orientation as horizontal.

8. The computer program product of claim 1, wherein:
clustering the sorted horizontal oriented text lines comprises
identifying text lines that overlap vertically within a first horizontal tolerance and that are spaced vertically within a second horizontal tolerance, the first horizontal tolerance and the second horizontal tolerance based on a font size associated with the identified vertically overlapping text lines,
clustering the identified vertically overlapping text lines into the logical blocks of horizontal text,
clustering logical blocks of horizontal text that overlap vertically within the first horizontal tolerance, and
merging text lines within the clustered logical block which share a common horizontal axis; and
clustering the sorted vertical oriented text lines comprises
identifying text lines that overlap horizontally within a first vertical tolerance and that are spaced horizontally within a second vertical tolerance, the first vertical tolerance and the second vertical tolerance based on a font size associated with the identified horizontally overlapping text lines,
clustering the identified horizontally overlapping text lines into the logical blocks of vertical text,
clustering logical blocks of vertical text that overlap horizontally within the first vertical tolerance, and
merging text lines within the clustered logical block which share a common vertical axis.

9. The computer program product of claim 1, wherein the second clustering method includes:
calculating an angle of rotation of the text blocks in the stream of text blocks, the text blocks included in the stream of text blocks comprising elements including one or more of characters, glyphs, and words;
grouping the text blocks in the stream of text blocks into clusters based on the angle of rotation;
rotating the clusters by a second angle of rotation associated with the cluster, such that all the rotated clusters have a horizontal orientation;
for each cluster
creating horizontal lines comprising the text blocks included in the cluster,
clustering the horizontal lines into horizontal paragraphs, and
determining an average horizontal spacing between the elements of the text blocks included in the horizontal lines;
for each horizontal paragraph
creating vertical lines comprising the text blocks included in the horizontal paragraph,
determining an average vertical spacing between the elements of the text blocks included in the vertical lines, and
choosing a horizontal line format if the average horizontal spacing is less than the average vertical spacing, otherwise choose a vertical line format; and
rotating the horizontal paragraphs to restore the second angle of rotation of the clusters associated with the horizontal paragraphs.

10. A computer program product including one or more non-transitory machine-readable mediums encoded with instructions that when executed by one or more processors cause a process to be carried out for clustering of text, the process comprising:
receiving a plurality of text blocks, the text blocks comprising elements;
calculating an angle of rotation of the text blocks;
grouping the text blocks into clusters based on the angle of rotation;
rotating the clusters to correct for the angle of rotation associated with the cluster;
for each cluster: (a) creating horizontal lines comprising the text blocks included in the cluster, (b) clustering the horizontal lines into horizontal paragraphs, and (c) determining an average horizontal spacing between the elements of the text blocks included in the horizontal lines;
for each horizontal paragraph: (a) creating vertical lines comprising the text blocks included in the horizontal paragraph, (b) determining an average vertical spacing between the elements of the text blocks included in the vertical lines, and (c) choosing a horizontal line format if the average horizontal spacing is less than the average vertical spacing, otherwise choose a vertical line format; and
rotating the horizontal paragraphs to restore the angle of rotation.

11. The computer program product of claim 10, wherein creating a particular horizontal line comprises:
identifying a topmost element of the text blocks included in a particular cluster;
identifying text blocks located within a threshold vertical distance of a horizontal reference line passing through the topmost element;
traversing the identified text blocks in a right to left order from the identified topmost element up to a leftmost spatial discontinuity, the spatial discontinuity based on a font size and a text scale associated with the identified text blocks;
traversing the identified text blocks in a left to right order from the identified topmost element up to a rightmost spatial discontinuity; and
creating the particular horizontal line to include one or more text blocks from the leftmost spatial discontinuity to the rightmost spatial discontinuity.

12. The computer program product of claim 10, wherein clustering the horizontal lines into horizontal paragraphs comprises:
identifying horizontal lines that overlap vertically within a first tolerance and that are spaced vertically within a second tolerance, the first tolerance and the second tolerance based on a font size associated with the horizontal lines;
clustering the identified horizontal text lines into logical blocks;
clustering the logical blocks that overlap vertically within the first tolerance; and
merging horizontal text lines within the clustered logical blocks which share a common horizontal axis.

13. The computer program product of claim 10, wherein choosing the horizontal line format is further based on a determination that a count of the horizontal lines is less than a count of the vertical lines.

14. A system comprising a memory and one or more processors operatively coupled to the memory, the memory storing instructions that, when executed by the one or more processors, cause a text clustering method to be carried out, the text clustering method comprising:

receiving an input stream of text blocks exported from a first digital document having a first format, wherein the input stream of text blocks are received in a second digital document having a second format that is different than the first format, and wherein the input stream includes first and second text blocks that are part of a text object of the first digital document;

interrogating grid coordinates associated with the received text blocks;

in response to determining that same orientation text lines are populating in the second digital document in a sequential fashion based on interrogating the grid coordinates, determining that the input stream of text blocks is received in sequential reading order;

in response to determining that text lines are populating in the second digital document in a random fashion based on interrogating the grid coordinates, determining that the input stream of text blocks are received in non-sequential arbitrary order;

executing a first clustering method to determine if the first and second text blocks belong to a first logical block corresponding to the text object, the first clustering method being executed in response to text blocks of the input stream being received in sequential reading order; and executing a second clustering method to determine if the first and second text blocks belong to a second logical block corresponding to the text object, the second clustering method being executed in response to text blocks of the input stream being received in non-sequential arbitrary order, the second clustering method different from the first clustering method.

15. The system of claim 14, wherein one or both of the first and second clustering methods is configured to measure a distance between the first and second text blocks, and in response to the distance being less than a distance threshold, determine that the first and second text blocks belong to either the first logical block or the second logical block.

16. The system of claim 14, wherein
it is determined that the input stream is received in non-sequential arbitrary order in response to determining that text lines are populating in the second digital document in the random checkerboard fashion and (b) a grammatical error rate associated with the input stream exceeding an error threshold.

17. The system of claim 14, wherein the first clustering method comprises:

generating text lines as a combination of two or more text blocks in the input stream based on evaluation of an alignment cost function and a proximity measurement applied to the two or more text blocks;

calculating an angle of rotation of the generated text lines;

rotating the generated text lines to correct for the angle of rotation;

determining an orientation of the generated text lines, the orientation one of horizontal oriented text lines or vertical oriented text lines;

sorting the horizontal oriented text lines from top to bottom;

sorting the vertical oriented text lines from left to right;

clustering the sorted horizontal oriented text lines into logical blocks of horizontal text;

clustering the sorted vertical oriented text lines into logical blocks of vertical text; and rotating at least one logical block from amongst the logical blocks of horizontal text and the logical blocks of vertical text to restore the angle of rotation of text lines included in the rotated at least one logical block.

18. The system of claim 14, wherein the second clustering method comprises:

calculating an angle of rotation of the text blocks, the text blocks comprising elements;

grouping the text blocks into clusters based on the angle of rotation;

rotating the clusters such that all the rotated clusters have a horizontal orientation;

for each cluster (a) creating horizontal lines comprising the text blocks included in the cluster, (b) clustering the horizontal lines into horizontal paragraphs, and (c) determining an average horizontal spacing between the elements of the text blocks included in the horizontal lines;

for each horizontal paragraph (a) creating vertical lines comprising the text blocks included in the horizontal paragraph, (b) determining an average vertical spacing between the elements of the text blocks included in the vertical lines, and (c) choosing a horizontal line format if the average horizontal spacing is less than the average vertical spacing, otherwise choose a vertical line format; and rotating the horizontal paragraphs to restore the angle of rotation.

* * * * *